United States Patent
Kinjo et al.

(10) Patent No.: US 12,253,425 B2
(45) Date of Patent: Mar. 18, 2025

(54) FORCE SENSOR

(71) Applicant: Japan Display Inc., Tokyo (JP)

(72) Inventors: Hiroumi Kinjo, Tokyo (JP); Masatomo Hishinuma, Tokyo (JP)

(73) Assignee: Japan Display Inc., Tokyo (JP)

( * ) Notice: Subject to any disclaimer, the term of this patent is extended or adjusted under 35 U.S.C. 154(b) by 275 days.

(21) Appl. No.: 18/153,435

(22) Filed: Jan. 12, 2023

(65) Prior Publication Data

US 2023/0236079 A1 Jul. 27, 2023

(30) Foreign Application Priority Data

Jan. 26, 2022 (JP) ................................ 2022-010283

(51) Int. Cl.
*G01L 1/22* (2006.01)
(52) U.S. Cl.
CPC .................................. *G01L 1/2293* (2013.01)
(58) Field of Classification Search
None
See application file for complete search history.

(56) References Cited

U.S. PATENT DOCUMENTS

| | | | | |
|---|---|---|---|---|
| 6,155,120 A * | 12/2000 | Taylor | .................. | A61B 5/1036 73/862.046 |
| 9,411,457 B2 * | 8/2016 | Perlin | .................. | G06F 3/04144 |
| 9,524,020 B2 * | 12/2016 | Perlin | .................. | G06F 3/04144 |
| 10,320,064 B2 | 6/2019 | Vaddiparty et al. | | |
| 2013/0319137 A1 * | 12/2013 | Grau | .................. | G06F 3/04144 73/862.381 |
| 2017/0177134 A1 * | 6/2017 | Kurasawa | ......... | G02F 1/134309 |

FOREIGN PATENT DOCUMENTS

JP 2018-044937 A 3/2018

* cited by examiner

*Primary Examiner* — Suman K Nath
*Assistant Examiner* — Nigel H Plumb
(74) *Attorney, Agent, or Firm* — K&L Gates LLP

(57) ABSTRACT

A force sensor includes a resin substrate, an array substrate, a sensor layer, a common electrode, and a protective film that are sequentially stacked. The array substrate includes a stretchable base material stacked on the resin substrate, and an array layer stacked on the resin substrate with the stretchable base material interposed between the array layer and the resin substrate, and the stretchable base material includes a plurality of first extension parts extending in a first direction parallel to the resin substrate and arranged in a second direction parallel to the resin substrate and intersecting the first direction, a plurality of second extension parts extending in the second direction and arranged in the first direction, and a plurality of body parts provided at parts where the first extension parts intersect the second extension parts.

9 Claims, 23 Drawing Sheets

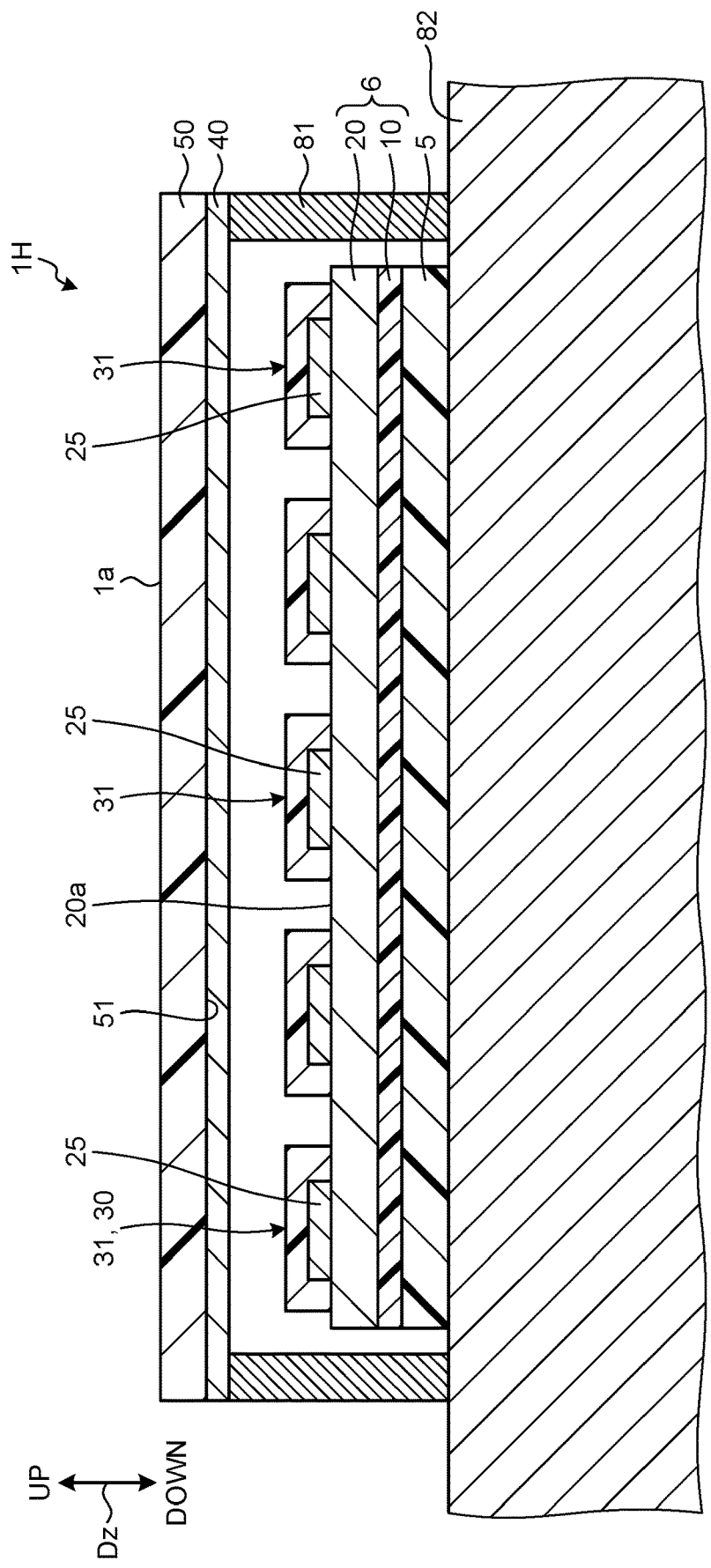

FORCE SENSOR

CROSS-REFERENCE TO RELATED APPLICATION

This application claims the benefit of priority from Japanese Patent Application No. 2022-010283 filed on Jan. 26, 2022, the entire contents of which are incorporated herein by reference.

BACKGROUND

1. Technical Field

The present invention relates to a force sensor.

2. Description of the Related Art

A force sensor includes an array substrate provided with a plurality of array electrodes, and a counter substrate facing the array electrodes and supporting a common electrode. The counter substrate is a base material to which force is input, and is also called a protective film. In Japanese Patent Application Laid-open Publication No. 2018-44937 (JP-A-2018-44937), a sensor layer covering the common electrode is provided on a surface of the counter substrate, the surface facing the array electrodes. A conductive elastomer is used as the sensor layer of JP-A-2018-44937. The conductive elastomer is a mixture of a rubber material as an insulator with a conductive material. Thus, the electric resistance of the conductive elastomer decreases when the conductive elastomer deforms.

Recently, a force sensor (stretchable force sensor) that is stretchable in a planar direction has been disclosed. In such a force sensor, the array substrate and the counter substrate expand and contract. However, the resistance value of the sensor layer changes when the sensor layer expands and contracts in accordance with expansion and contraction of the array substrate or the counter substrate. Accordingly, an accurate force value cannot be detected.

The present invention is intended to provide a force sensor capable of detecting an accurate force value even when expanding and contracting.

SUMMARY

A force sensor according to a first embodiment of the present disclosure includes a resin substrate, an array substrate, a sensor layer, a common electrode, and a protective film that are sequentially stacked. The array substrate includes a stretchable base material stacked on the resin substrate, and an array layer stacked on the resin substrate with the stretchable base material interposed between the array layer and the resin substrate, the stretchable base material includes a plurality of first extension parts extending in a first direction parallel to the resin substrate and arranged in a second direction parallel to the resin substrate and intersecting the first direction, a plurality of second extension parts extending in the second direction and arranged in the first direction, and a plurality of body parts provided at parts where the first extension parts intersect the second extension parts, the array layer includes a plurality of array-layer branch parts stacked on the first extension parts or the second extension parts, and a plurality of array-layer body parts stacked on the body parts, the array-layer body parts each include a first surface facing the common electrode, and an array electrode stacked on the first surface, the sensor layer includes a plurality of divisional sensor layers divided in the first direction and the second direction, and the divisional sensor layers are provided on the first surfaces and cover the array electrodes.

A force sensor according to a second embodiment of the present disclosure includes a resin substrate, an array substrate, a sensor layer, a common electrode, and a protective film that are sequentially stacked. The array substrate includes a stretchable base material stacked on the resin substrate, and an array layer stacked on the resin substrate with the stretchable base material interposed between the array layer and the resin substrate, the stretchable base material includes a plurality of first extension parts extending in a first direction parallel to the resin substrate and arranged in a second direction parallel to the resin substrate and intersecting the first direction, a plurality of second extension parts extending in the second direction and arranged in the first direction, and a plurality of body parts provided at parts where the first extension parts intersect the second extension parts, the array layer includes a plurality of array-layer branch parts stacked on the first extension parts or the second extension parts, and a plurality of array-layer body parts stacked on the body parts, the array-layer body parts each include a first surface facing the common electrode, an array electrode stacked on the first surface, and an annular guard electrode stacked on the first surface, surrounding the array electrode, and equipotential with the array electrode, and the sensor layer is provided at the array-layer branch parts and the array-layer body parts and covers the array electrodes and the annular guard electrodes.

BRIEF DESCRIPTION OF THE DRAWINGS

FIG. 23 is a sectional view schematically illustrating a section of a force sensor of a seventh modification.

DETAILED DESCRIPTION

Aspects (embodiments) of a force sensor of the present disclosure will be described below in detail with reference to the accompanying drawings. Contents described below in the embodiments do not limit the invention of the present disclosure. Constituent components described below include those that could be easily thought of by the skilled person in the art and those identical in effect. Constituent components described below may be combined as appropriate. What is disclosed herein is merely exemplary, and any modification that could be easily thought of by the skilled person in the art as appropriate without departing from the gist of the invention is contained in the scope of the present invention. For clearer description, the drawings are schematically illustrated for the width, thickness, shape, and the like of each component as compared to an actual aspect in some cases, but the drawings are merely exemplary and do not limit interpretation of the present invention. In the present specification and the drawings, any constituent component same as that already described with reference to an already described drawing is denoted by the same reference sign, and detailed description thereof is omitted as appropriate in some cases.

In the present specification and the claims, an expression with "on" in description of an aspect in which one structural body is disposed on another structural body includes both a case in which the one structural body is directly disposed on the other structural body in contact and a case in which the one structural body is disposed above the other structural body with still another structural body interposed therebetween, unless otherwise stated in particular.

First Embodiment

Figure 1:
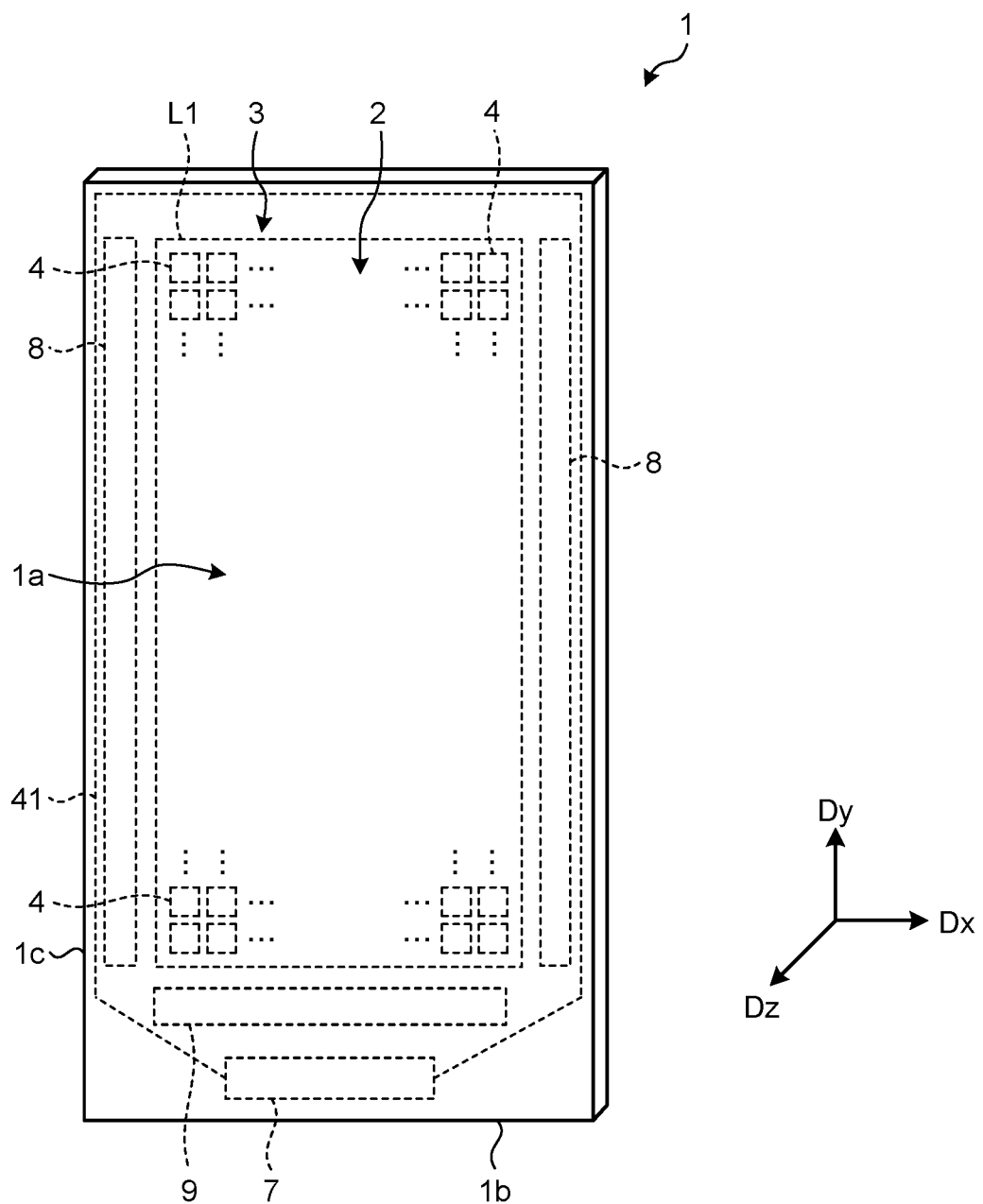
FIG. 1 is a perspective diagram of a force sensor according to a first embodiment when viewed from a detection surface.

FIG. 1 is a perspective diagram of a force sensor according to a first embodiment when viewed from a detection surface. As illustrated in FIG. 1, this force sensor 1 is a device having a plate shape. One surface of the force sensor 1 is a detection surface 1a to which force is input. The force sensor 1 has a rectangular shape when viewed in the normal direction of the detection surface 1a.

The detection surface 1a of the force sensor 1 is divided into a detection region 2 in which force can be detected and a peripheral region 3 having a frame shape surrounding the outside of the detection region 2. In FIG. 1, a boundary line L1 is illustrated to facilitate understanding of the boundary between the detection region 2 and the peripheral region 3. The detection region 2 is divided into a plurality of individual detection regions 4. In other words, the detection region 2 is a set of the individual detection regions 4.

The individual detection regions 4 are arrayed in a first direction Dx and a second direction Dy. The first direction Dx is parallel to the detection surface 1a. The second direction Dy is parallel to the detection surface 1a and intersects the first direction Dx. In the present embodiment, the first direction Dx is parallel to a short side 1b of the force sensor 1. The second direction Dy is parallel to a long side 1c of the force sensor 1. Accordingly, in the present embodiment, the first direction Dx and the second direction Dy are orthogonal to each other. The normal direction (stacking direction) of the detection surface 1a is referred to as a third direction Dz.

Figure 2:
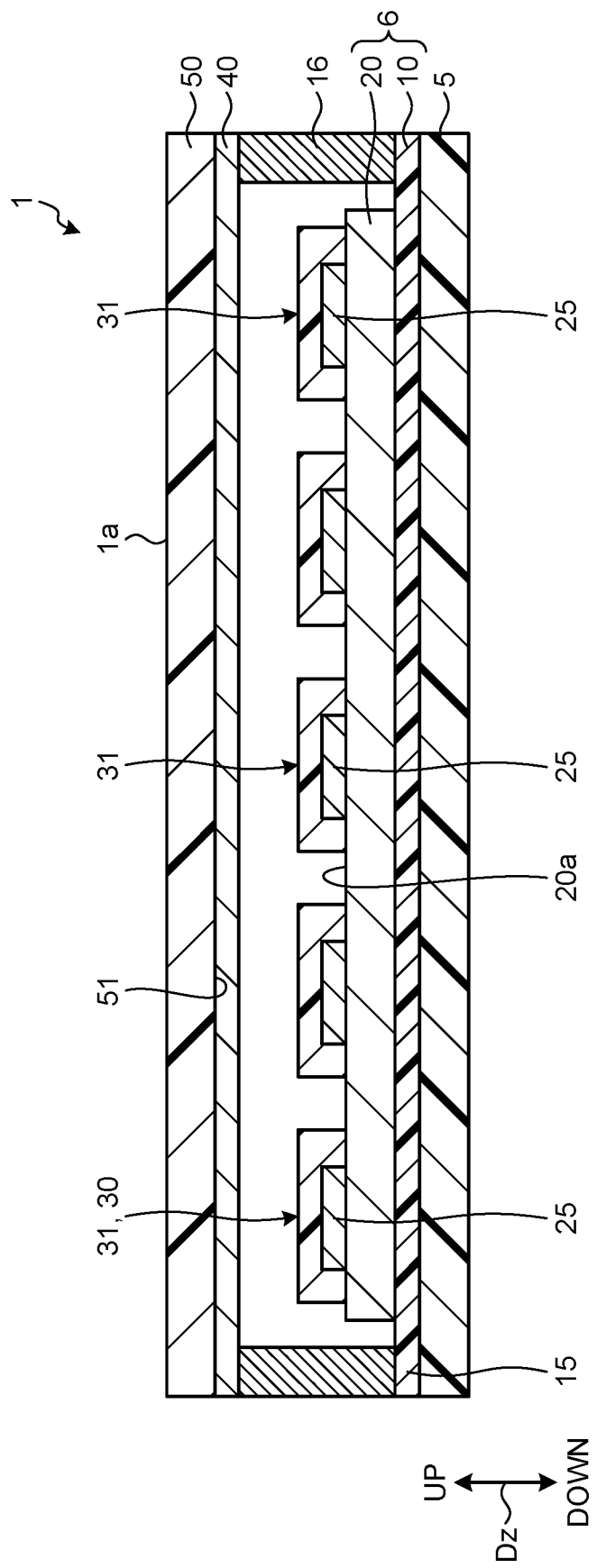
FIG. 2 is a sectional view schematically illustrating a section of the force sensor according to the first embodiment.

FIG. 2 is a sectional view schematically illustrating a section of the force sensor according to the first embodiment. As illustrated in FIG. 2, the force sensor 1 includes a resin substrate 5, an array substrate 6, a sensor layer 30, a common electrode 40, and a protective film 50 that are sequentially stacked in the third direction Dz.

Hereinafter, an upper side or upward is one side in the third direction Dz and means a side on which the array substrate 6 is disposed when viewed from the resin substrate 5. In addition, a lower side or downward is the other side in the third direction Dz and means a side on which the resin substrate 5 is disposed when viewed from the array substrate 6. A view from the upper side is referred to as a plan view in some cases.

The resin substrate 5 is a base material of the force sensor 1. The resin substrate 5 has a rectangular shape in a plan view. The resin substrate 5 is made of resin and is stretchable and flexible.

The array substrate 6 includes a stretchable base material 10 stacked on the resin substrate 5, and an array layer 20 stacked on the resin substrate 5 with the stretchable base material 10 interposed therebetween. The stretchable base material 10 is a thin film deposited on the upper surface of the resin substrate 5. The stretchable base material 10 is stretchable, flexible, and insulating. The stretchable base material 10 contains resin material such as polyimide.

Figure 3:
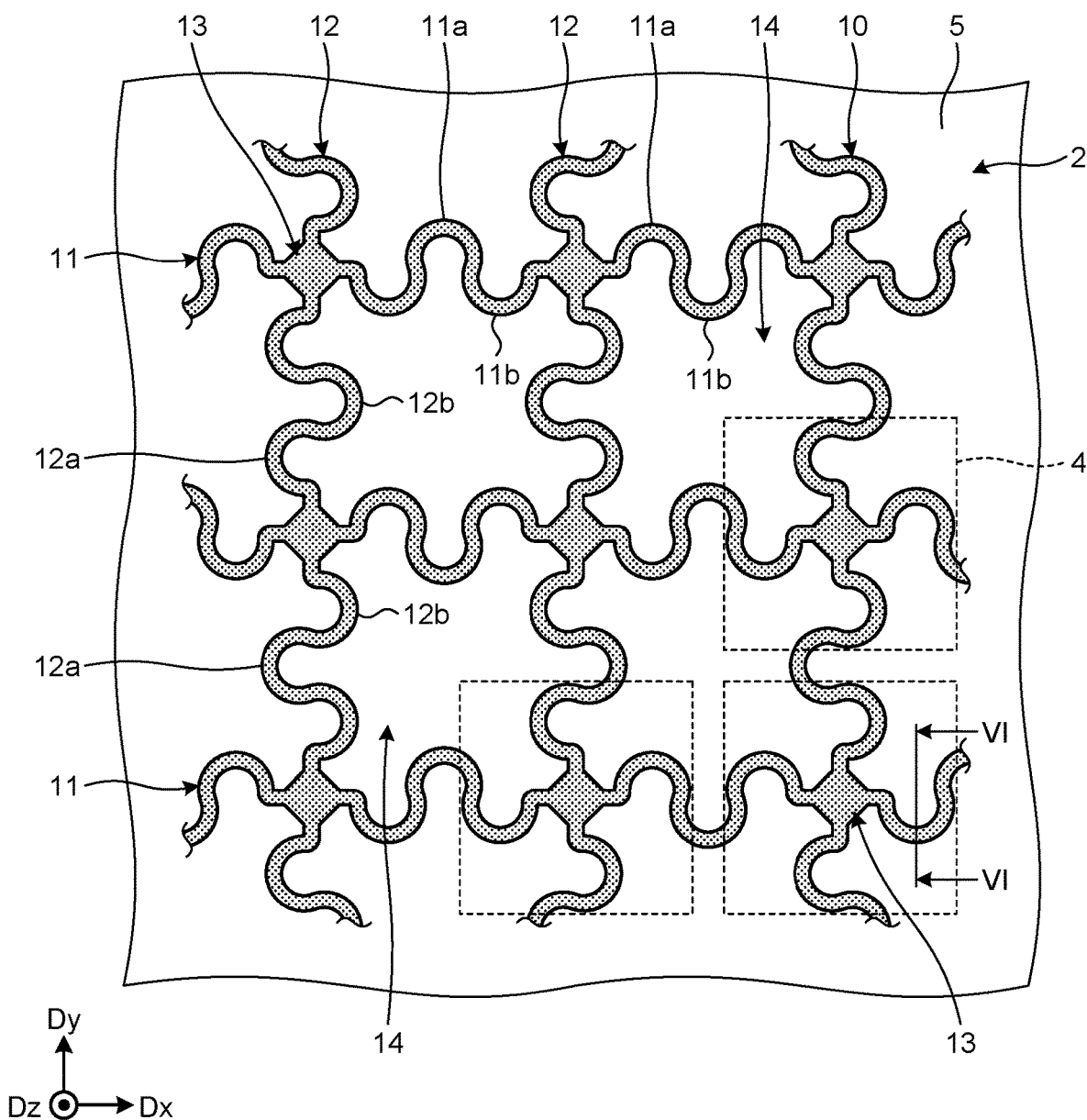
FIG. 3 is an enlarged plan view of part of a stretchable base material disposed in a detection region.

FIG. 3 is an enlarged plan view of part of the stretchable base material disposed in the detection region. As illustrated in FIG. 3, the stretchable base material 10 includes a plurality of first extension parts 11 extending in the first direction Dx in the detection region 2, a plurality of second extension parts 12 extending in the second direction Dy in the detection region 2, and a plurality of body parts 13 provided at parts where the first extension parts 11 intersect the second extension parts 12.

The first extension parts 11 are arrayed in the second direction Dy. Each first extension part 11 is a combination of first arc parts 11a protruding on one side in the second direction Dy and second arc parts 11b protruding on the other side in the second direction Dy. Each first extension part 11 of the present embodiment includes three arc parts of two first arc parts 11a and one second arc part 11b or of one first arc part 11a and two second arc parts 11b. Accordingly, each first extension part 11 extends in the first direction Dx while alternately bending on the one side and the other side in the second direction Dy.

The second extension parts 12 are arrayed in the first direction Dx. Each second extension part 12 is a combination of third arc parts 12a protruding on one side in the first direction Dx and fourth arc parts 12b protruding on the other side in the first direction Dx. Each second extension part 12 of the present embodiment includes three arc parts of two third arc parts 12a and one fourth arc part 12b or of one third arc part 12a and two fourth arc parts 12b. Accordingly, each second extension part 12 extends in the second direction Dy while alternately bending on the one side and the other side in the first direction Dx.

Figure 4:
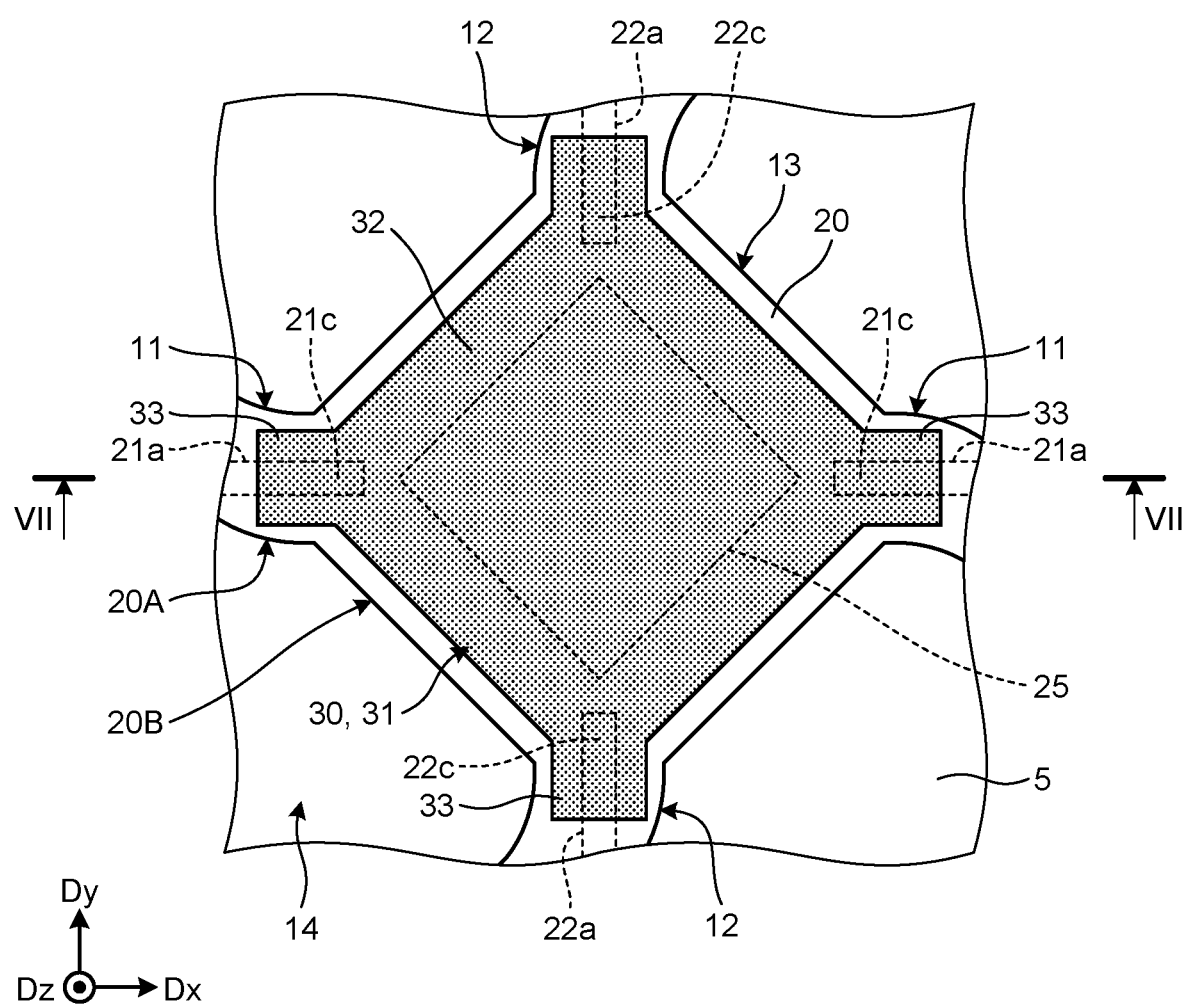
FIG. 4 is a plan view of a state in which an array layer and a sensor layer are stacked on a body part of the stretchable base material.

FIG. 4 is a plan view of a state in which the array layer and the sensor layer are stacked on a body part of the stretchable base material. As illustrated in FIG. 4, the body part 13 has a rectangular shape in a plan view and has four corners. The body part 13 is disposed such that the four corners point in the first direction Dx and the second direction Dy. Each corner of the body part 13 is merged (coupled) with a first extension part 11 or a second extension part 12.

Accordingly, as illustrated in FIG. 3, a plurality of punched parts 14 surrounded by the first extension parts 11 and the second extension parts 12 are formed through the stretchable base material 10. The punched parts 14 penetrate in the third direction Dz. The resin substrate 5 is exposed through the punched parts 14. When a load is applied on such a stretchable base material 10 in the first direction Dx or the second direction Dy, the region of each punched part 14 having a smaller stiffness deforms with expansion and contraction. In other words, the first extension parts 11 or the second extension parts 12 expand and contract. Accordingly, the body part 13 expands and contracts in the first direction Dx or the second direction Dy by an extremely small amount.

In addition, the stretchable base material 10 includes a frame part 15 having a frame shape extending along the peripheral region 3 (refer to FIG. 2; not illustrated in the other drawings). The inner periphery side of the frame part 15 is coupled with the first extension parts 11 and the second extension parts 12. A bonding layer 16 that bonds the protective film 50 is provided on the upper side of the frame part 15. In the present disclosure, the frame part 15 and the protective film 50 may be bonded to each other with a spacer interposed therebetween.

The array layer 20 is stacked on the upper surface of the stretchable base material 10. The array layer 20 includes an array-layer peripheral part (not illustrated) stacked on the frame part 15 of the stretchable base material 10, an array-layer branch part 20A (refer to FIG. 6) stacked on a first extension part 11 or a second extension part 12, and an array-layer body part 20B (refer to FIG. 7) stacked on a body part 13. Drive transistors 23 and array electrodes 25 are disposed in the array-layer body part 20B (refer to FIG. 7).

As illustrated in FIG. 1, a coupling part 7, gate line drive circuits 8, a signal line selection circuit 9, gate lines 21 (refer to FIG. 5), signal lines 22 (refer to FIG. 5), and a common wire 41 are provided at the array-layer peripheral part (not illustrated).

The coupling part 7, the gate line drive circuits 8, and the signal line selection circuit 9 are disposed in the peripheral region 3. The coupling part 7 is used to couple with a drive integrated circuit (IC) disposed outside the force sensor 1. In the present disclosure, the drive IC may be mounted as a chip-on film (COF) on a flexible printed board or a rigid substrate coupled with the coupling part 7. Alternatively, the drive IC may be mounted as a chip-on glass (COG) in the peripheral region 3 of the resin substrate 5.

The gate line drive circuits 8 are circuits configured to drive the gate lines 21 (refer to FIG. 5) based on various kinds of control signals from the drive IC. The gate line drive circuits 8 sequentially or simultaneously select a plurality of gate lines 21 (refer to FIG. 5) and supply a gate drive signal to the selected gate lines 21. The signal line selection circuit 9 is a switch circuit configured to sequentially or simultaneously select a plurality of signal lines 22 (refer to FIG. 5). The signal line selection circuit 9 is, for example, a multiplexer. The signal line selection circuit 9 couples the selected signal lines 22 to the drive IC based on a selection signal supplied from the drive IC.

The common wire 41 is a wire for supplying predetermined voltage to the common electrode 40 and extends along the peripheral region 3. The common wire 41 is coupled to the drive IC through the coupling part 7 and supplied with constant voltage from the drive IC.

Figure 5:
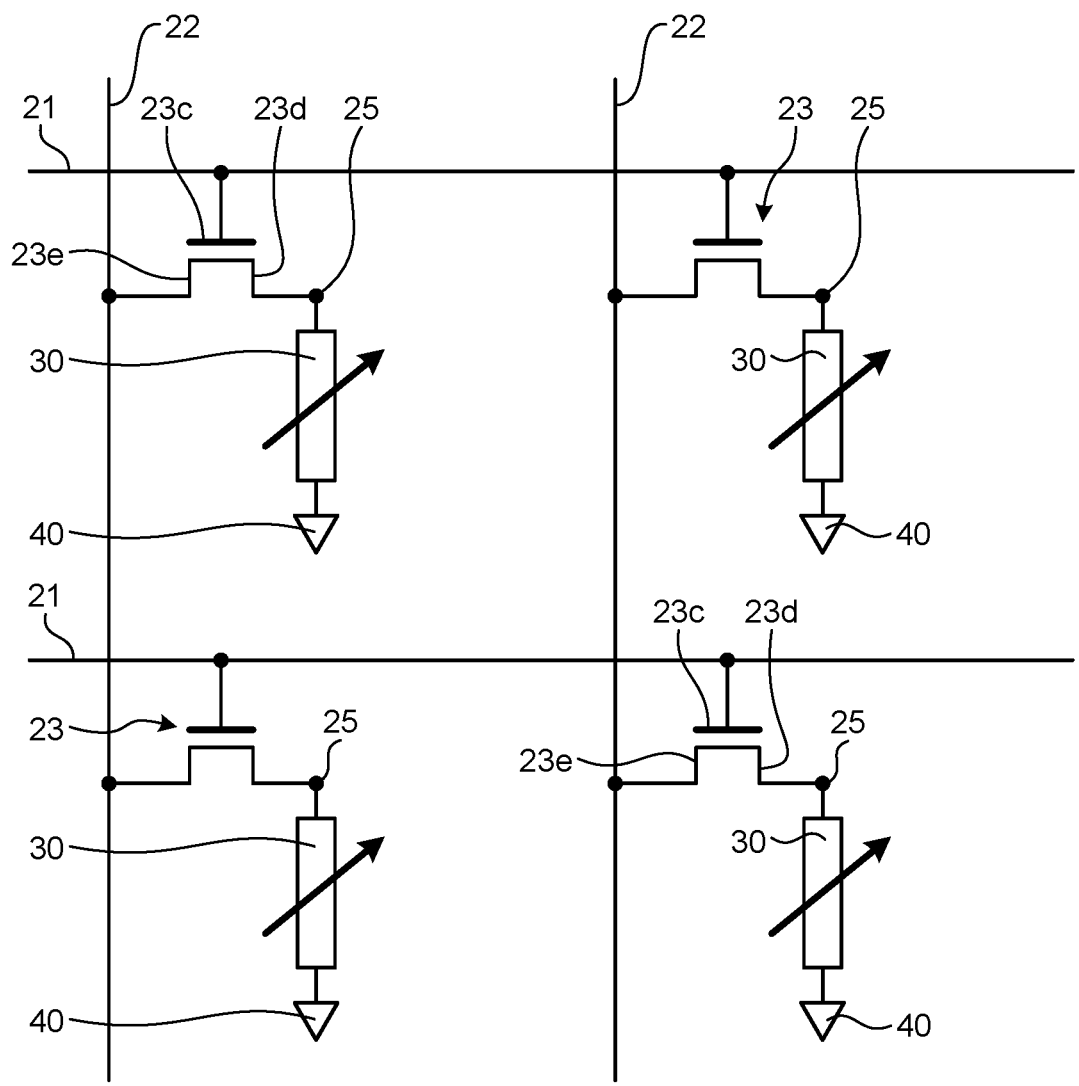
FIG. 5 is a circuit diagram illustrating a circuit configuration of the force sensor of the first embodiment.

FIG. 5 is a circuit diagram illustrating a circuit configuration of the force sensor of the first embodiment. The gate lines 21 and the signal lines 22 are routed from the peripheral region 3 (the gate line drive circuits 8 or the signal line selection circuit 9) into the detection region 2. As illustrated in FIG. 5, the gate lines 21 extend in the first direction Dx. The gate lines 21 are arrayed in the second direction Dy. The signal lines 22 extend in the second direction Dy. The signal lines 22 are arrayed in the first direction Dx.

In the detection region 2, the gate lines 21 are stacked on the first extension parts 11 and the body parts 13 of the stretchable base material 10 and extend in the first direction Dx. In other words, each gate line 21 includes a first gate line 21a (refer to FIG. 6) extending on a first extension part 11, and a second gate line 21b (refer to FIG. 7) extending on a body part 13. Details thereof will be described below.

Figure 6:
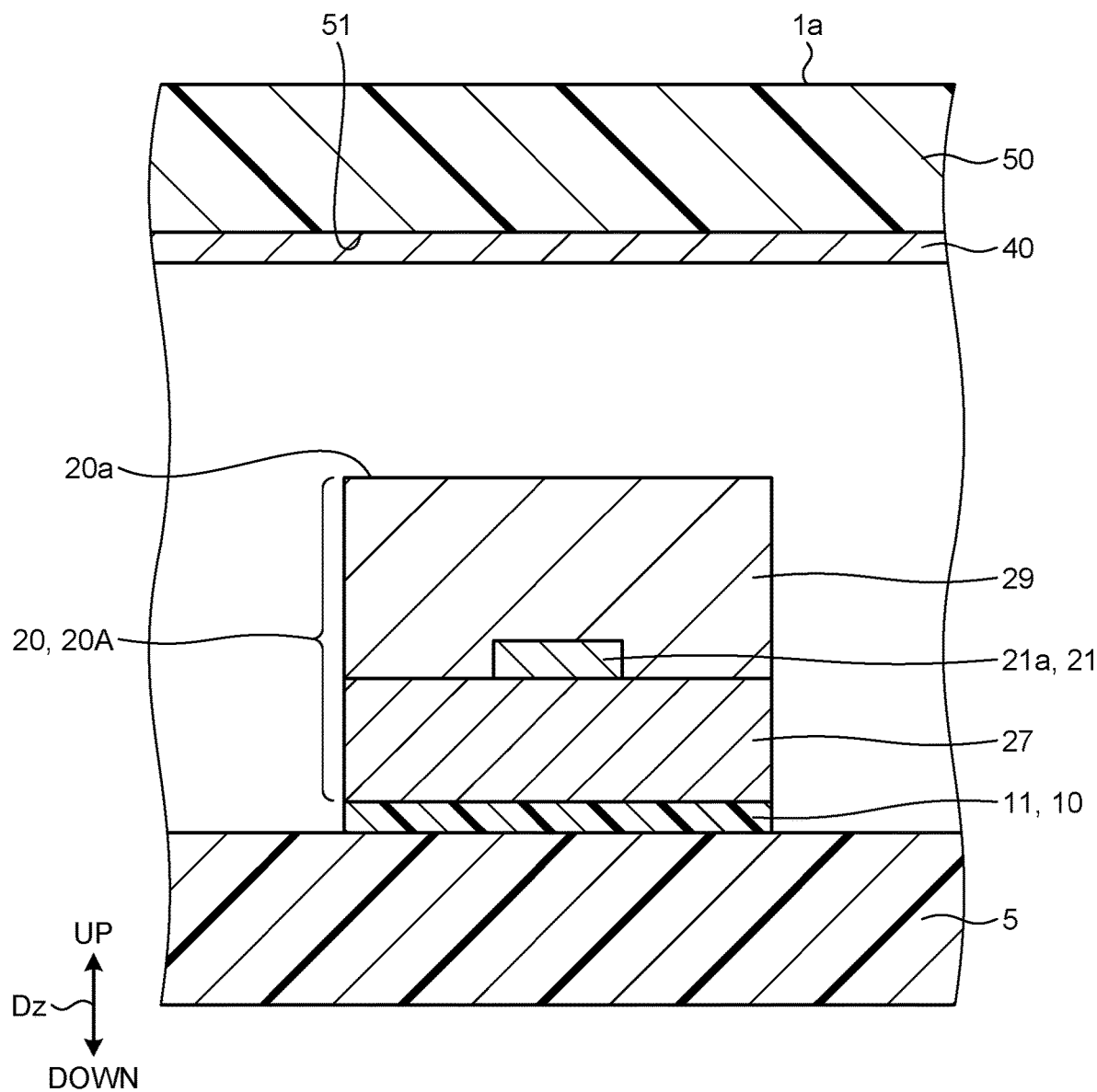
FIG. 6 is a sectional view of the force sensor of the first embodiment taken along line III-III in FIG. 3.

FIG. 6 is a sectional view of the force sensor of the first embodiment taken along line VI-VI in FIG. 3. As illustrated in FIG. 6, the array-layer branch part 20A includes a first insulating layer 27 stacked on the upper surface of each corresponding first extension part 11, the first gate line 21a stacked on the upper surface of the first insulating layer 27, and a third insulating layer 29 stacked on the upper surface of the first insulating layer 27 and the upper surface of the first gate line 21a. Accordingly, the first gate line 21a extends in the first direction Dx while meandering along the first extension part 11. An end part 21c of the first gate line 21a in the first direction Dx extends to a body part 13 (refer to FIG. 4).

Figure 7:
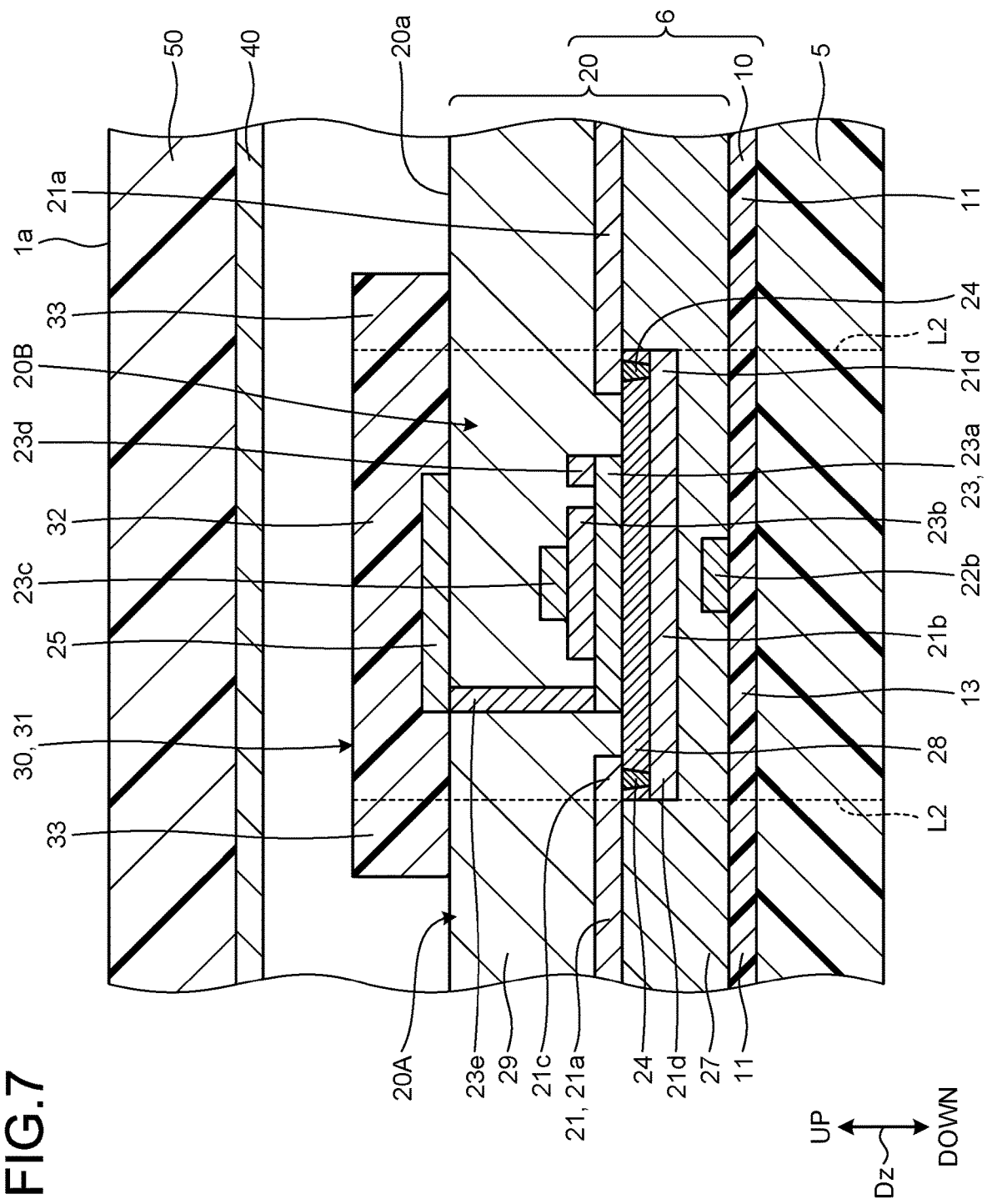
FIG. 7 is a sectional view of the force sensor of the first embodiment taken along line IV-IV in FIG. 4.

FIG. 7 is a sectional view of the force sensor of the first embodiment taken along line VII-VII in FIG. 4. In FIG. 7, a boundary line L2 is illustrated to facilitate understanding of the boundary between the array-layer body part 20B (body part 13) and the array-layer branch part 20A (first extension part 11). As illustrated in FIG. 7, the second gate line 21b stacked between the first insulating layer 27 and a second insulating layer 28 and extending in the first direction Dx is provided at the array-layer body part 20B. An end part 21d of the second gate line 21b is coupled to the end part 21c of the first gate line 21a through a contact layer 24. Accordingly, the first gate lines 21a and the second gate lines 21b are alternately coupled to form the gate line 21.

In the detection region 2, the signal lines 22 are stacked on the second extension parts 12 and the body parts 13 of the stretchable base material 10 and extend in the second direction Dy. In other words, each signal line 22 includes a first signal line 22a (refer to FIG. 4) extending on a second extension part 12, and a second signal line 22b (refer to FIG. 7) extending on a body part 13.

Although not particularly illustrated, similarly to the first gate line 21a, the first signal line 22a is stacked between the first insulating layer 27 and the third insulating layer 29 stacked on the upper side of the second extension parts 12. Accordingly, the first signal line 22a extends in the second direction Dy while meandering along the second extension part 12. An end part 22c of the first signal line 22a extends to a body part 13 (refer to FIG. 4).

As illustrated in FIG. 7, the second signal line 22b is stacked between each corresponding body part 13 and the first insulating layer 27 and extends in the second direction Dy. An end part of the second signal line 22b is coupled to the end part 22c of the first signal line 22a through a non-illustrated contact layer. Accordingly, the first signal lines 22a and the second signal lines 22b are alternately coupled to form the signal line 22.

The array-layer body part 20B includes the second signal line 22b, the first insulating layer 27, the second gate line 21b, the second insulating layer 28, a drive transistor 23, the third insulating layer 29, and an array electrode 25 that are sequentially stacked on the upper surface of the corresponding body part 13. The upper surface of the third insulating layer 29 is referred to as a first surface 20a of the array layer 20 (array substrate 6) and flattened.

Each drive transistor 23 includes a semiconductor layer 23a, a gate insulating film 23b, a gate electrode 23c, a drain electrode 23d, and a source electrode 23e. The source electrode 23e is electrically coupled to an array electrode 25. The gate electrode 23c is coupled to a gate line 21 through a contact layer 23f. The drain electrode 13d is coupled to a signal line 22 through a non-illustrated contact layer. Accordingly, when the gate line 21 is scanned, the array electrode 25 is electrically coupled to the signal line 22. An electric signal (current value) input to the array electrode 25 is obtained through the signal line 22.

The sensor layer 30 is a conductive elastomer as a mixture of a rubber material (parent material) that is an insulator with a conductive material. The sensor layer 30 has a large resistance value when no force is input. When force is input to the sensor layer 30, fine particles in the rubber material contact or approach each other and the resistance value of the sensor layer 30 decreases. Moreover, as the amount of deformation of the rubber material increases, the number of contacting fine particles increases and the resistance value of the sensor layer 30 significantly decreases.

As illustrated in FIG. 2, the sensor layer 30 is stacked on the first surface 20a of the array layer 20. The sensor layer 30 includes a plurality of divisional sensor layers 31 divided in the first direction Dx and the second direction Dy. The number of divisional sensor layers 31 is equal to the number of array electrodes 25, and the divisional sensor layers 31 are bonded to the first surface 20a.

As illustrated in FIG. 4, each divisional sensor layer 31 includes a sensor-layer body part 32 stacked on the corresponding array-layer body part 20B, and a sensor-layer extension part 33 extending (expanding) from the array-layer body part 20B to an array-layer branch part 20A. The sensor-layer body part 32 has a rectangular shape.

As illustrated in FIG. 7, the sensor-layer body part 32 covers the corresponding array electrode 25 from above and contact the array electrode 25. The sensor-layer body part 32 is separated from the common electrode 40 disposed on the upper side. Accordingly, the sensor-layer body part 32 has conduction with the array electrode 25 and insulation from the common electrode 40. The sensor-layer extension part 33 is a part extending from the sensor-layer body part 32 in the first direction Dx or the second direction Dy. With this configuration, the area of bonding between the sensor layer 30 and the array layer 20 is large and the strength of fixation of the sensor layer 30 improves.

The protective film 50 is a resin base material that is stretchable, flexible, and insulating. As illustrated in FIG. 7, the protective film 50 includes an opposite surface 51 facing the lower side and opposite the sensor layer 30, and the detection surface 1a facing the upper side.

The common electrode 40 is a solid film provided on the opposite surface 51. The common electrode 40 is, for example, a conductive layer containing a plurality of metal fillers inside a parent material (resin), or a conductive layer containing a plurality of silver nanofibers placed over each other inside a parent material (resin). Predetermined voltage is applied to the common electrode 40 through the common wire 41.

Figure 8:
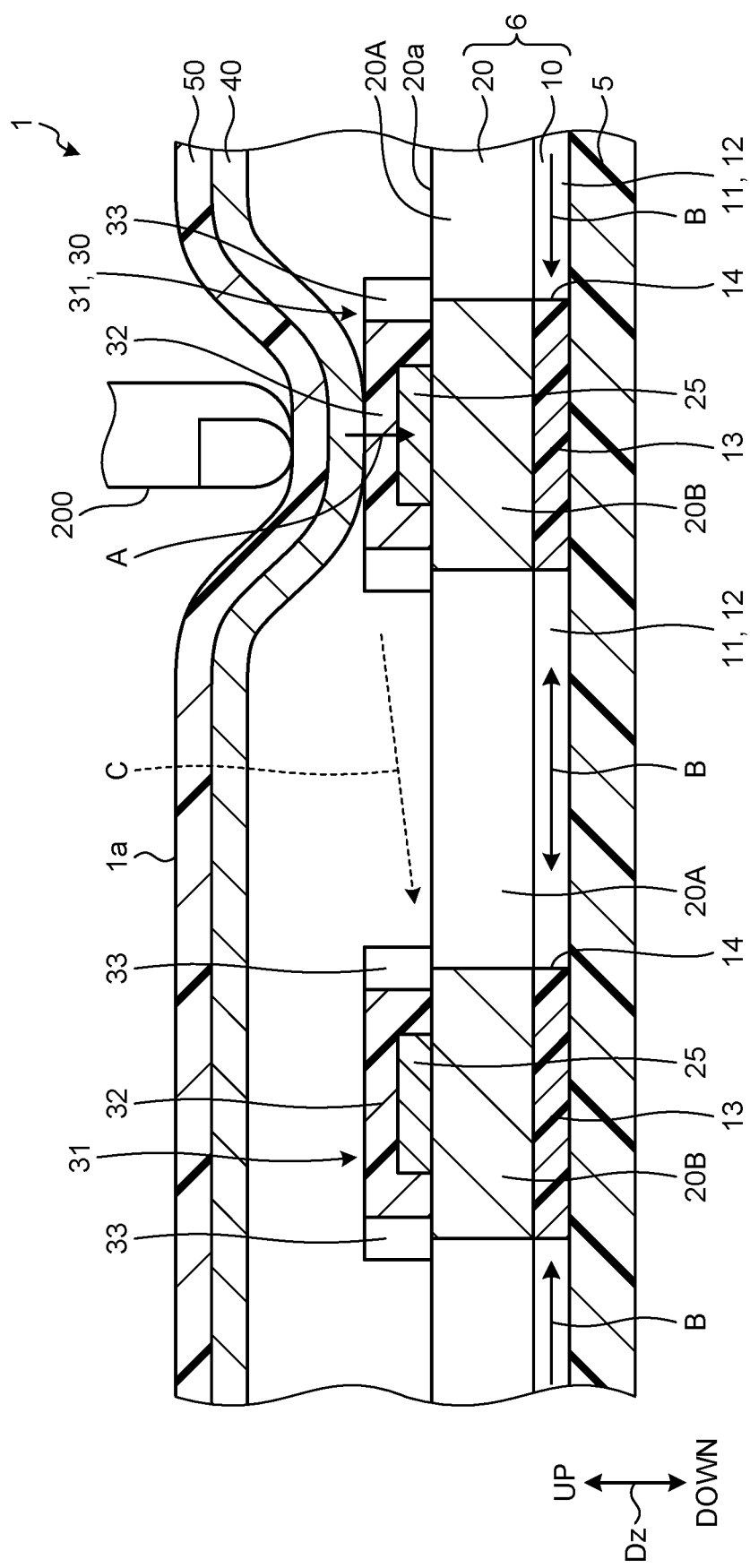
FIG. 8 is a sectional view illustrating the force sensor of the first embodiment when pressed.

FIG. 8 is a sectional view illustrating the force sensor of the first embodiment when pressed. The following describes a method of using the force sensor 1. When the detection surface 1a of the force sensor 1 is pressed by a finger 200, part of the protective film 50 deforms and protrudes on the lower side. Accordingly, the common electrode 40 contacts the sensor layer 30. As a result, the common electrode 40 is electrically coupled to an array electrode 25. Current flows from the common electrode 40 to the array electrode 25 (refer to arrow A in FIG. 8). Then, the value of the current input to the array electrode 25 is output from the corresponding signal line 22.

When an expansion-contraction load is applied to the force sensor 1 in the first direction Dx or the second direction Dy, a load in the first direction Dx or the second direction Dy is applied to the resin substrate 5. Accordingly, a load in the first direction Dx or the second direction Dy is applied to the stretchable base material 10 stacked on the resin substrate 5. In addition, the stretchable base material 10 of the present embodiment, which is provided with the punched parts 14, expands and contracts at low stiffness parts. Accordingly, the first extension parts 11 or the second extension parts 12 expand and contract (refer to arrow B in FIG. 8). As a result, the amount of expansion and contraction of each body part 13 is extremely small.

Thus, the amounts of deformation of the array-layer body part 20B and the sensor-layer body part 32 stacked on the body part 13 are extremely small as well. In other words, each divisional sensor layer 31 (sensor-layer body part 32) does not deform (the resistance value thereof does not change) due to an expansion-contraction load in the first direction Dx or the second direction Dy. Thus, an accurate force value can be detected.

Each sensor-layer extension part 33 of the present embodiment is stacked on a first extension part 11 or a second extension part 12 but along a relatively short length. Accordingly, the sensor-layer extension part 33 does not expand nor contract (deform) following the first extension part 11 or the second extension part 12. Thus, the resistance value of the sensor-layer extension part 33 does not change.

Each divisional sensor layer 31 is separated and insulated from other adjacent divisional sensor layers 31. Accordingly, current flow between adjacent array electrodes 25 through the sensor layer 30 (refer to dashed line arrow C in FIG. 8) is prevented.

Figure 9:
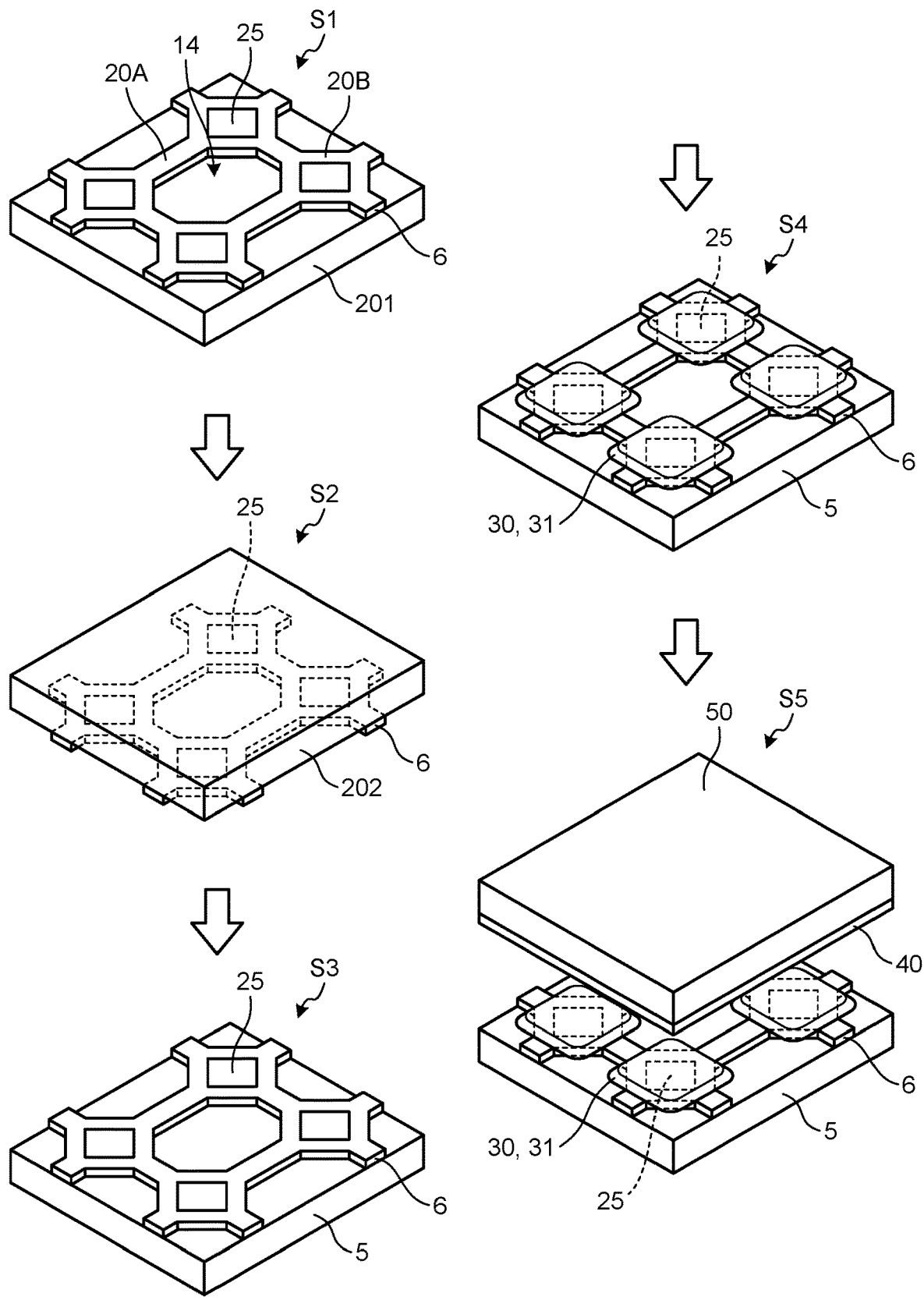
FIG. 9 is a diagram illustrating the process of a method of manufacturing a force sensor 1 of the first embodiment.

FIG. 9 is a diagram illustrating the process of a method of manufacturing the force sensor 1 of the first embodiment. As illustrated in FIG. 9, the method of manufacturing the force sensor 1 of the first embodiment includes an array substrate manufacturing configuration S1, a first transfer process S2 of performing transfer to a transfer material, a second transfer process S3 of performing transfer to the resin substrate 5, a sensor layer stacking process S4 of stacking the sensor layer 30, and an integration process S5 of integrating the base material and the protective film. The shape of the stretchable base material 10 is abstracted in FIG. 9.

The array substrate manufacturing configuration S1 is a process of manufacturing the array substrate 6 on a glass substrate 201. Specifically, first, the material (for example, polyimide) of the stretchable base material 10 is deposited on the glass substrate 201. Subsequently, each layer of the array layer 20 (including the array electrodes 25) is deposited on the stretchable base material 10. Thereafter, the punched parts 14 of the stretchable base material 10 are formed by performing etching from above the array layer 20. Simultaneously with the formation of the punched parts 14, the array-layer branch parts 20A and the array-layer body parts 20B are formed as well.

The first transfer process S2 is a process of transferring the array substrate 6 from the glass substrate 201 onto a transfer material 202. The transfer material 202 is, for example, an adhesive tape. The present process is performed by first placing the transfer material 202 over the array substrate 6 from above so that the upper surface of the array substrate 6 adheres to the transfer material 202. Subsequently, the array substrate 6 is removed from the array substrate 6 by peeling off the transfer material 202. Accordingly, the array substrate 6 is transferred onto the transfer material 202.

The second transfer process S3 is a process of transferring the array substrate 6 from the transfer material 202 onto the resin substrate 5. A non-illustrated bonding agent is applied to the resin substrate 5. Accordingly, the array substrate 6 is bonded to the resin substrate 5 through the present process.

The sensor layer stacking process S4 is a process of stacking the sensor layer 30 (divisional sensor layers 31) on the array-layer body parts 20B. In FIG. 9, the divisional sensor layers 31 are illustrated in square shapes for simplification. The divisional sensor layers 31 are fixed to the array-layer body parts 20B by bonding.

The integration process S5 applies a bonding layer (not illustrated) to the peripheral region 3 of the array substrate 6. Subsequently, an edge part of the protective film 50 on which the common electrode 40 is deposited in advance is placed over the bonding layer. Then, those layers are integrated when the bonding layer is cured. Accordingly, the process of manufacturing the force sensor 1 ends.

The force sensor 1 of the first embodiment is described above, but the present disclosure is not limited to examples in the first embodiment. Each divisional sensor layer 31 of the first embodiment includes the sensor-layer extension part 33 in addition to the sensor-layer body part 32, but in the present disclosure, the divisional sensor layer may include only the sensor-layer body part. Moreover, the sensor layer 30 of the embodiment has a flat upper surface but may include a protrusion toward the common electrode, and the sensor layer is not limited to a particular shape in the present disclosure.

Figure 10:
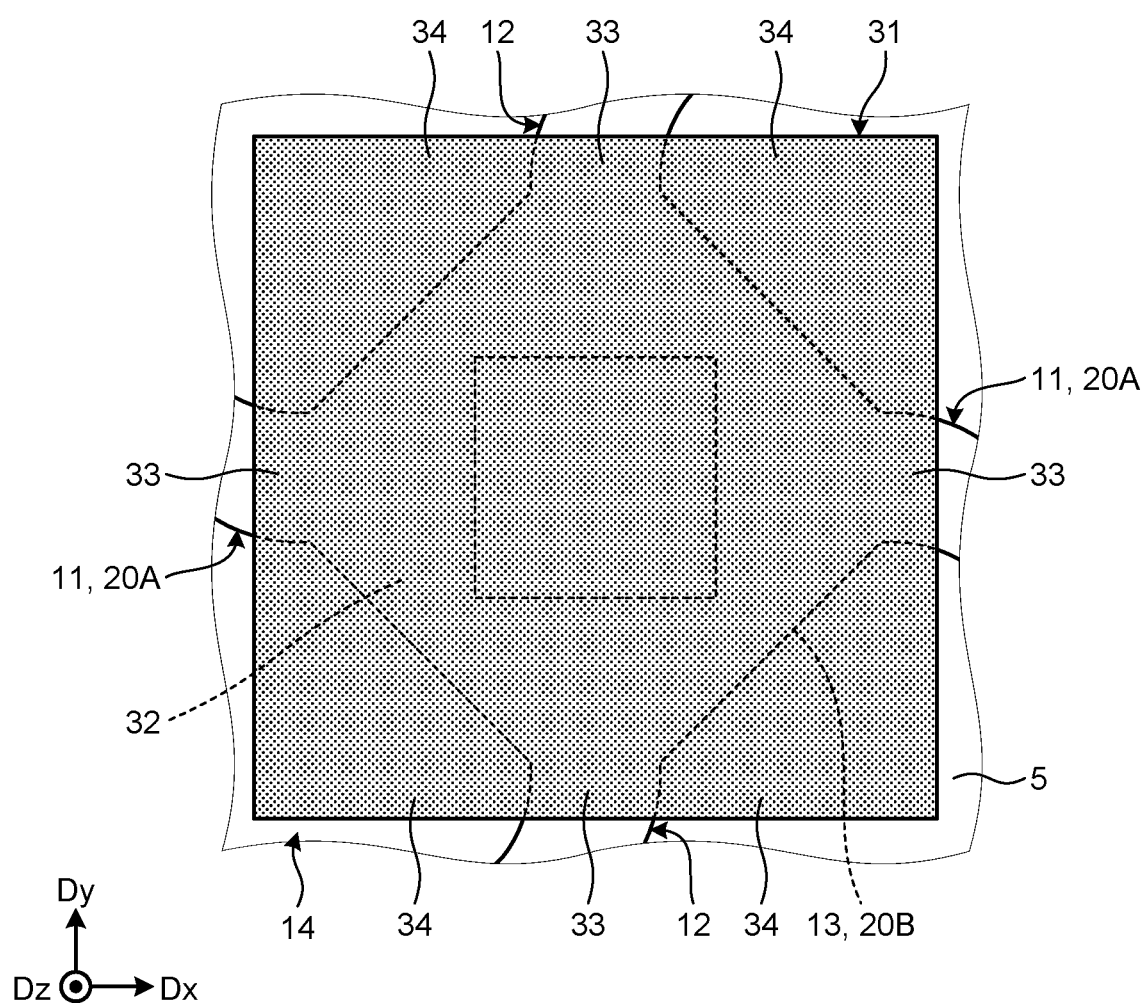
FIG. 10 is a plan view of a divisional sensor layer according to a first modification.

FIG. 10 is a plan view of a divisional sensor layer according to a first modification. Each divisional sensor layer 31 of the first embodiment is stacked on the first surface 20a of the array layer 20, but the present disclosure is not limited thereto. For example, as illustrated in FIG. 10, each divisional sensor layer 31A of the first modification has a rectangular shape in a plan view. Each divisional sensor layer 31A includes a sensor-layer body part 32, a sensor-layer extension part 33, and a sensor-layer protrusion part 34 protruding outside the array layer 20 in a plan view. The sensor-layer protrusion part 34 is stacked on the upper surface of the resin substrate 5. With this configuration, the area of bonding increases and the force of fixation of the divisional sensor layer 31A increases. The following describes a force sensor of a second embodiment. The description will be made mainly on any difference from the first embodiment.

Second Embodiment

Figure 11:
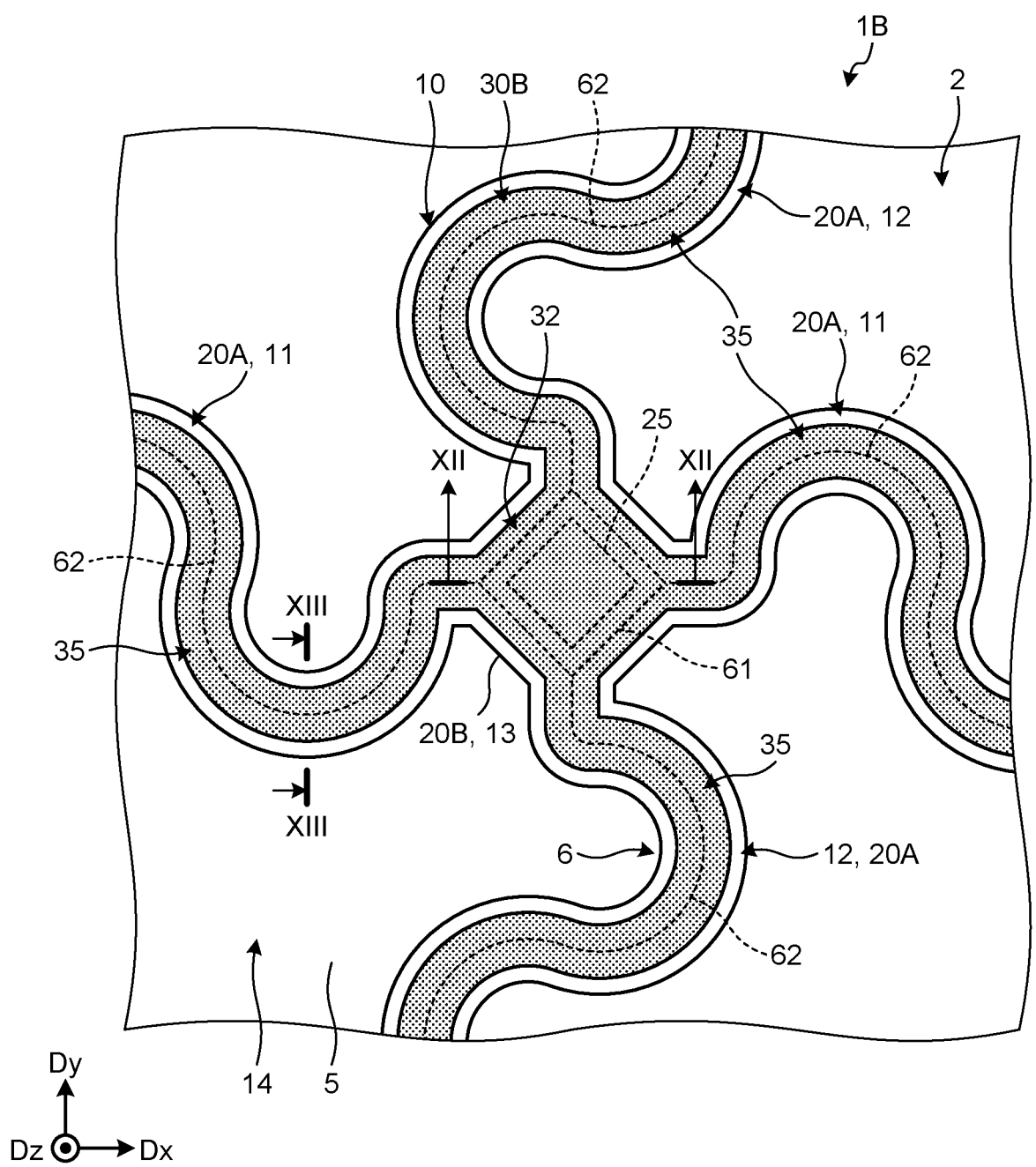
FIG. 11 is a plan view of part of the sensor layer, an array substrate, and a resin substrate in a force sensor of a second embodiment.
Figure 12:
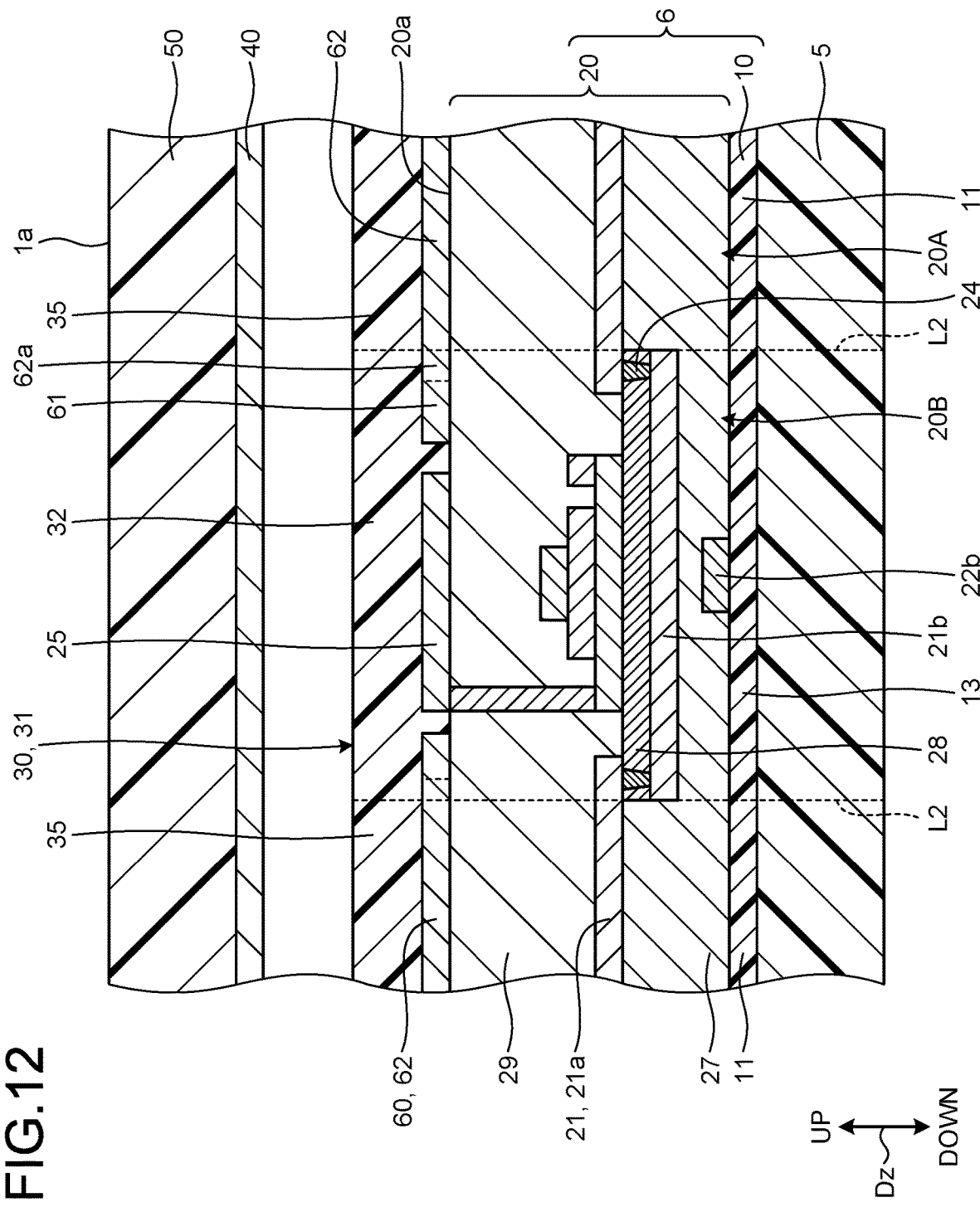
FIG. 12 is a sectional view taken along line XII-XII in FIG. 11 when viewed in the direction of arrows.
Figure 13:
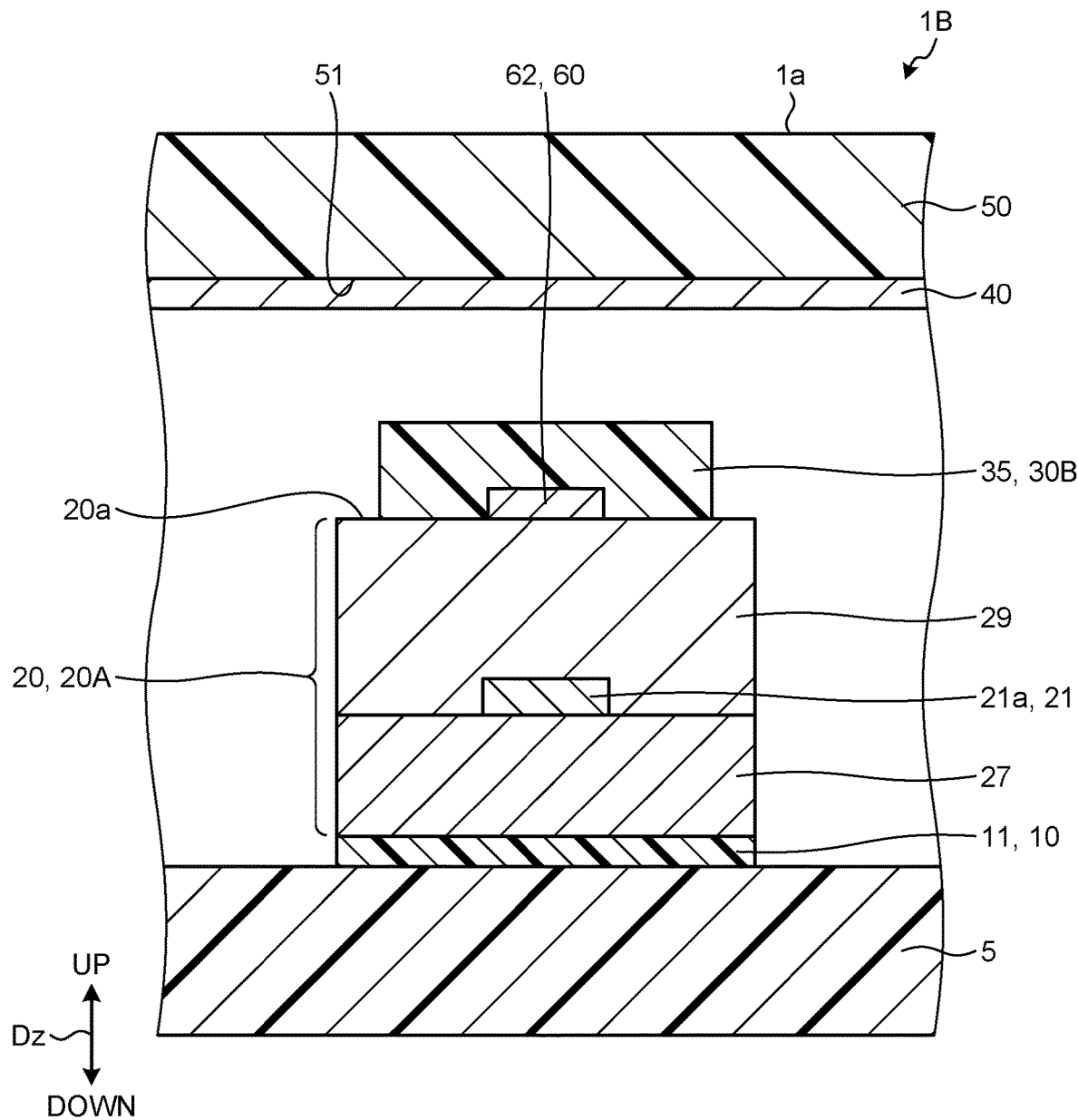
FIG. 13 is a sectional view taken along line XIII-XIII in FIG. 11 when viewed in the direction of arrows.

FIG. 11 is a plan view of part of the sensor layer, the array substrate, and the resin substrate in a force sensor of the second embodiment. FIG. 12 is a sectional view taken along line XII-XII in FIG. 11 when viewed in the direction of arrows. FIG. 13 is a sectional view taken along line XIII-XIII in FIG. 11 when viewed in the direction of arrows. As illustrated in FIG. 11, a force sensor 1B of the second embodiment includes a guard electrode 60, which is a difference from the first embodiment. The force sensor 1B of the second embodiment includes a sensor layer 30B in place of the sensor layer 30, which is another difference from the first embodiment.

The guard electrode 60 is made of a conductive material. The guard electrode 60 includes a plurality of annular guard electrodes 61 stacked on the array-layer body parts 20B, and a plurality of coupling guard electrodes 62 stacked on the array-layer branch parts 20A.

Each annular guard electrode 61 has an annular shape. The annular guard electrode 61 of the present embodiment has a rectangular frame shape in a plan view. An array electrode 25 is disposed on the inner periphery side of the annular guard electrode 61. As illustrated in FIG. 12, the annular guard electrode 61 is stacked on the first surface 20a of the array layer 20. Accordingly, the annular guard electrode 61 is disposed in the same layer as the array electrode 25.

As illustrated in FIG. 11, each coupling guard electrode 62 extends in the first direction Dx or the second direction Dy while meandering along an array-layer branch part 20A (first extension part 11 or second extension part 12). As illustrated in FIG. 13, the coupling guard electrode 62 is stacked on the first surface 20a of the array layer 20. As illustrated in FIG. 12, an end part 62a of the coupling guard electrode 62 extends to an array-layer body part 20B. The end part 62a of the coupling guard electrode 62 is coupled to an annular guard electrode 61. Accordingly, each coupling guard electrode 62 couples annular guard electrodes 61 adjacent to each other in the first direction Dx or the second direction Dy.

Although not particularly illustrated, any coupling guard electrode disposed at an edge part of the detection region 2 among the coupling guard electrodes 62 extends to the peripheral region 3 and is coupled to a guard electrode wire (not illustrated). The guard electrode wire is a wire for supplying predetermined voltage to the annular guard electrodes 61. The guard electrode wire (not illustrated) is coupled to the drive IC through the coupling part 7 and supplied with the predetermined voltage from the drive IC. When the force sensor 1B is used, voltage at the same potential as the potential of the array electrodes 25 is applied to the annular guard electrodes 61 through the guard electrode wire (not illustrated).

As illustrated in FIG. 11, the sensor layer 30B includes a sensor-layer body part 32 stacked on an array-layer body part 20B, and a sensor-layer coupling part 35 stacked on an array-layer branch part 20A. As illustrated in FIG. 12, similarly to the first embodiment, the sensor-layer body part 32 is stacked on the first surface 20a of the array layer 20 and covers an array electrode 25. In the second embodiment, the sensor-layer body part 32 covers an annular guard electrode 61 and contacts the annular guard electrode 61.

As illustrated in FIG. 11, the sensor-layer coupling part 35 extends in the first direction Dx or the second direction Dy while meandering along the array-layer branch part 20A (first extension part 11 or second extension part 12). As illustrated in FIG. 13, the sensor-layer coupling part 35 is stacked on the first surface 20a of the array layer 20 and covers a coupling guard electrode 62. Each sensor-layer coupling part 35 couples sensor-layer body parts 32 adjacent to each other in the first direction Dx or the second direction Dy (refer to FIG. 14).

Accordingly, in the sensor layer 30B of the second embodiment, a plurality of sensor-layer body parts 32 and a plurality of sensor-layer coupling parts 35 are integrated.

Figure 14:
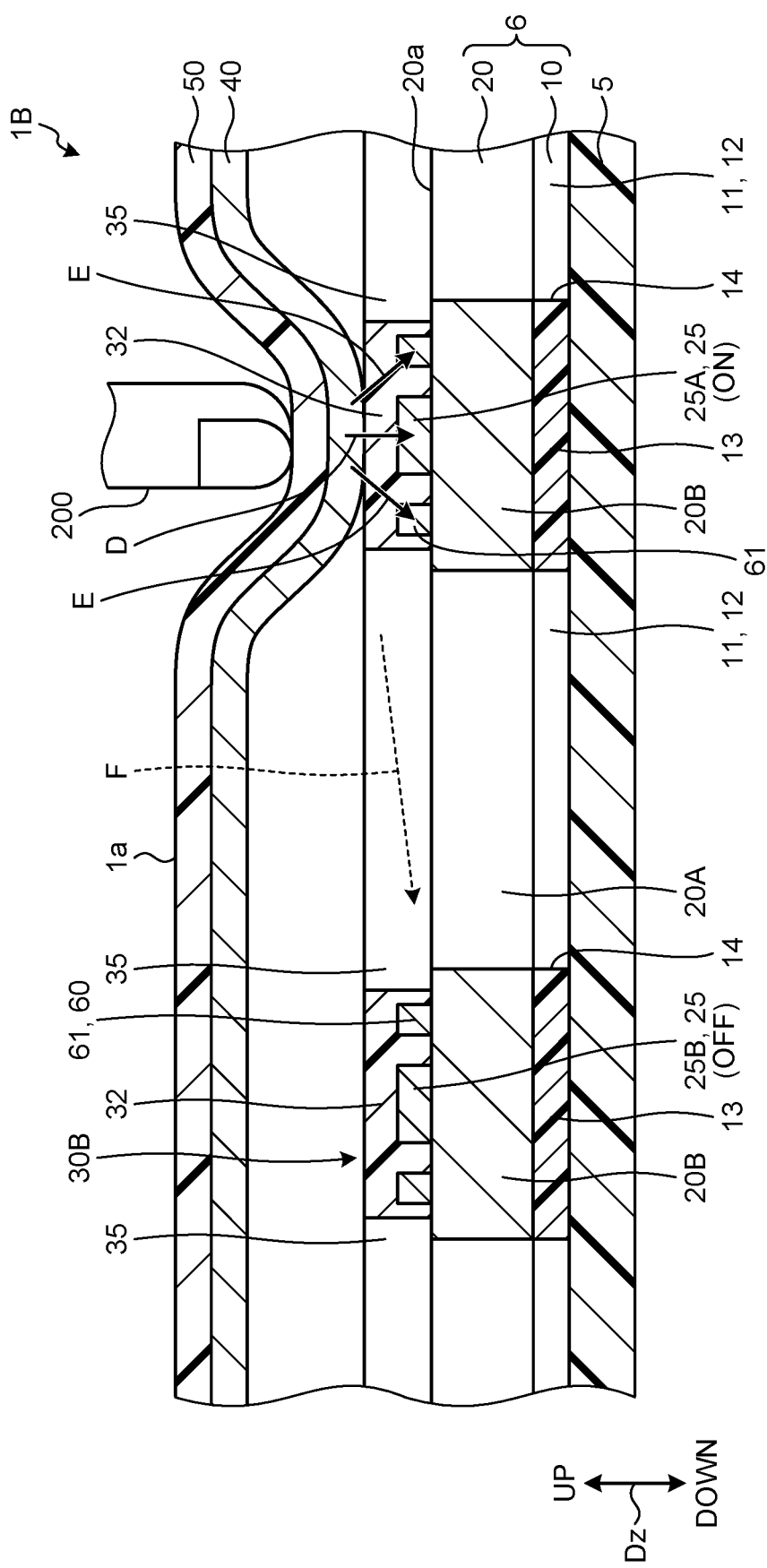
FIG. 14 is a sectional view illustrating an exemplary state in which the detection surface of the force sensor of the second embodiment is pressed.

FIG. 14 is a sectional view illustrating an exemplary state in which the detection surface of the force sensor of the second embodiment is pressed. The following describes a case in which part of the detection surface 1a of the force sensor 1B is pressed. In the following description, an array electrode 25 overlapping the pressed part in the third direction Dz is referred to as a pressed-down array electrode 25A, and an array electrode adjacent to the pressed-down array electrode 25A is referred to as an adjacent array electrode 25B.

As illustrated in FIG. 14, the detection surface 1a of the force sensor 1B is pressed by the finger 200, and the common electrode 40 contacts the sensor layer 30. When the pressed-down array electrode 25A is coupled to the corresponding signal line 22 (when the corresponding drive transistor 23 is on), the pressed-down array electrode 25A and the common electrode 40 are electrically coupled to each other. Accordingly, current flows to the pressed-down array electrode 25A (refer to arrow D in FIG. 14).

The annular guard electrode 61 surrounding the pressed-down array electrode 25A is equipotential with the pressed-down array electrode 25A. Accordingly, current also flows to the annular guard electrode 61 surrounding the pressed-down array electrode 25A (refer to arrow E in FIG. 14). Accordingly, current flowing from the common electrode 40 does not flow out of the annular guard electrode 61. In other words, current flowing from the common electrode 40 is avoided from flowing to the adjacent array electrode 25B through a sensor-layer coupling part 35 (refer to dashed line arrow F in FIG. 14).

Figure 15:
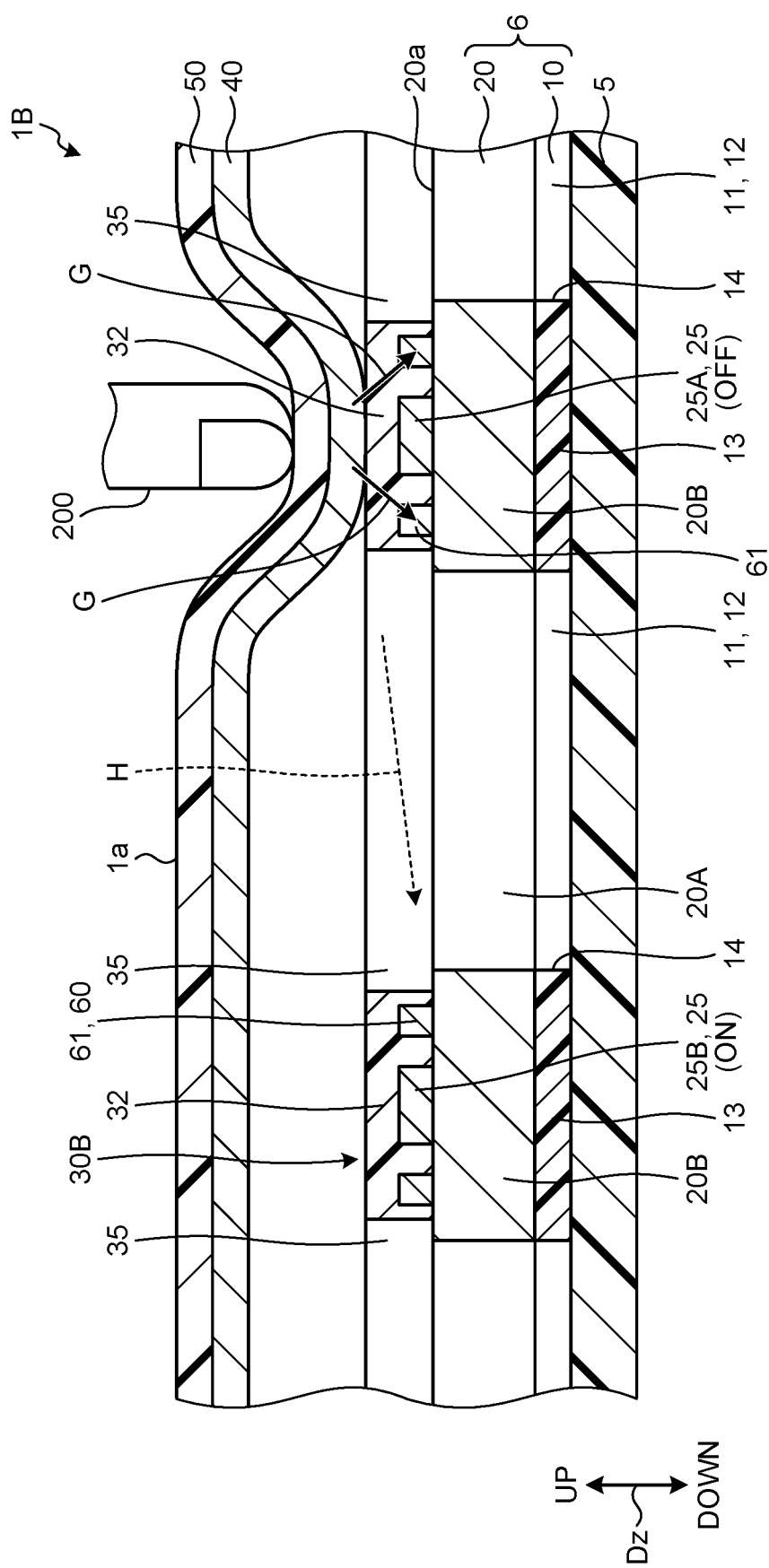
FIG. 15 is a sectional view illustrating another exemplary state in which the detection surface of the force sensor of the second embodiment is pressed.

FIG. 15 is a sectional view illustrating another exemplary state in which the detection surface of the force sensor of the second embodiment is pressed. As illustrated in FIG. 15, when the pressed-down array electrode 25A is not coupled to the corresponding signal line 22 (when the corresponding drive transistor 23 is off), the pressed-down array electrode 25A and the common electrode 40 are not electrically coupled to each other. Accordingly, no current flows to the pressed-down array electrode 25A.

When the adjacent array electrode 25B is coupled to the corresponding signal line 22 (when the corresponding drive transistor 23 is on), current passing through the sensor-layer coupling part 35 potentially flows to the adjacent array electrode 25B (refer to dashed line arrow H in FIG. 15). However, the annular guard electrode 61 surrounding the pressed-down array electrode 25A is disposed between the common electrode 40 and the adjacent array electrode 25B.

With this configuration, current flowing from the common electrode 40 flows to the annular guard electrodes 61 (refer to arrow G in FIG. 15) and does not flow to the adjacent array electrode 25B.

Accordingly, in the force sensor 1 of the second embodiment, the array electrodes 25 are electrically coupled to one another through the sensor layer 30B but no crosstalk occurs. Moreover, in the second embodiment, when an expansion-contraction load in the first direction Dx or the second direction Dy is applied to the force sensor 1B, the first extension parts 11 or the second extension parts 12 expand and contract as in the first embodiment. Accordingly, the amount of deformation of each sensor-layer body part 32 is extremely small and the resistance value of the sensor-layer body part 32 does not change. Thus, an accurate force value can be detected.

In expansion and contraction of the force sensor 1B, a sensor-layer coupling part 35 deforms along with expansion and contraction of the first extension parts 11 or the second extension parts 12. Then, when the common electrode 40 contacts the sensor-layer coupling part 35, current potentially flows toward an array electrode 25 through the sensor-layer coupling part 35. However, current toward the array electrode 25 flows to the corresponding annular guard electrode 61. Accordingly, when a site overlapping a sensor-layer coupling part 35 on the detection surface 1a is pressed, no current flows to the corresponding array electrode 25. In other words, no false electric signal (current) is input to the array electrode 25.

Figure 16:
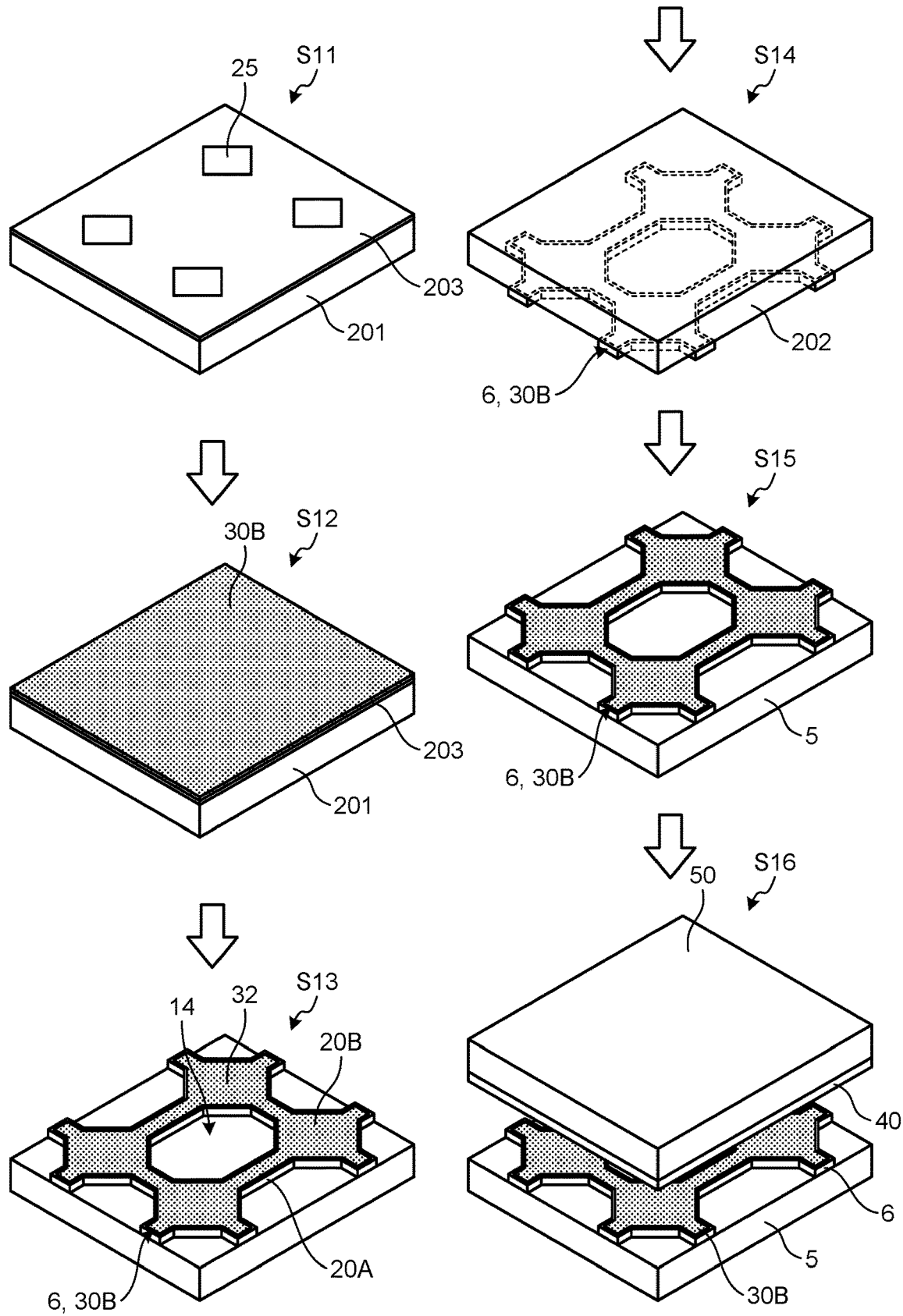
FIG. 16 is a diagram illustrating the process of a method of manufacturing the force sensor 1 of the second embodiment.

FIG. 16 is a diagram illustrating the process of a method of manufacturing the force sensor 1 of the second embodiment. As illustrated in FIG. 16, the method of manufacturing the force sensor 1B of the second embodiment includes a stacked body manufacturing process S11, a sensor layer stacking process S12, a shaping process S13, a first transfer process S14, a second transfer process S15, and an integration process S16. The shape of the stretchable base material 10 is abstracted in FIG. 16.

The stacked body manufacturing process S11 is a process of manufacturing a stacked body 203 by depositing each layer included in the array substrate 6 (the stretchable base material 10 and the array layer 20) on the glass substrate 201. The deposition is performed to form a solid film on the glass substrate 201. In the present process, only the shape of each array electrode 25 is shaped by etching or the like.

The sensor layer stacking process S12 stacks a solid film of the sensor layer 30B on the stacked body 203 (on the array electrodes 25). The present process may be performed by placing and fixing, on the stacked body 203 by bonding, a solid film of the sensor layer 30B manufactured in advance. Alternatively, the solid film may be deposited by applying a raw material of the sensor layer 30B on the stacked body 203.

The shaping process S13 forms the punched parts 14 of the stretchable base material 10 by performing etching the solid film of the sensor layer 30B from above. Accordingly, the array-layer branch parts 20A and the array-layer body parts 20B are formed as well. In addition, the sensor-layer body parts 32 and the sensor-layer coupling parts 35 are formed. As a result, the array substrate 6 on which the sensor layer 30B is stacked is manufactured.

The first transfer process S14 is a process of transferring the array substrate 6 from the glass substrate 201 onto the transfer material 202.

The second transfer process S15 is a process of transferring the array substrate 6 from the transfer material 202 onto the resin substrate 5. A non-illustrated bonding agent is applied to the resin substrate 5. Accordingly, the array substrate 6 is bonded to the resin substrate 5 through the present process.

The integration process S16 applies a bonding layer (not illustrated) to the peripheral region 3 of the array substrate 6. Subsequently, an edge part of the protective film 50 on which the common electrode 40 is deposited in advance is placed over the bonding layer. Then, those layers are integrated when the bonding layer is cured. Accordingly, the process of manufacturing the force sensor 1B ends.

The force sensor 1 of the second embodiment is described above, but the present disclosure is not limited to examples in the first embodiment. For example, each annular guard electrode has a rectangular frame shape in the second embodiment, but in the present disclosure, the annular guard electrode may have a circular frame shape and is not particularly limited. The following describes modifications of the second embodiment.

Second Modification

Figure 17:
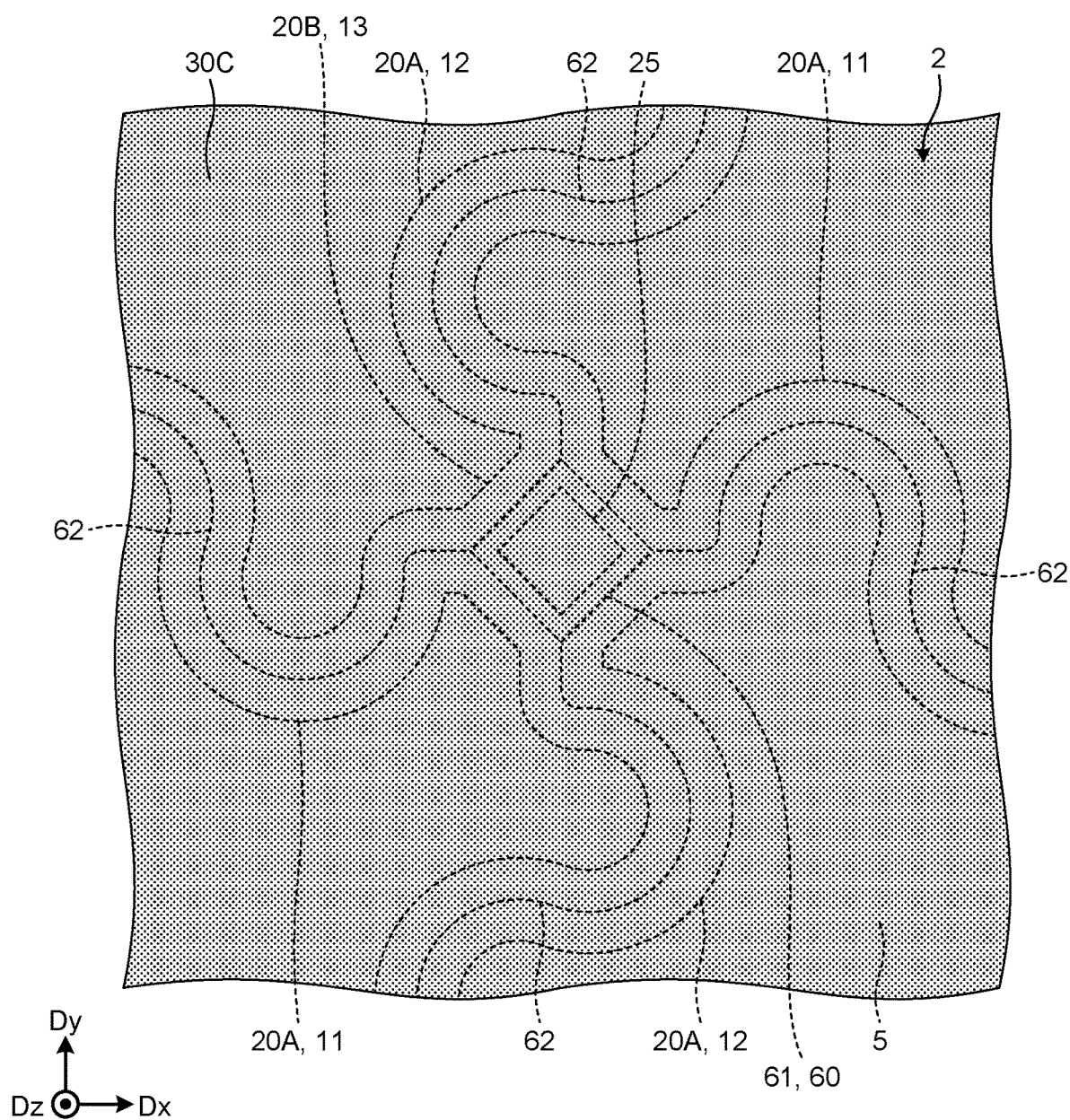
FIG. 17 is a plan view illustrating part of the sensor layer, the array substrate, and a substrate in a force sensor of a second modification when viewed from a common electrode.

FIG. 17 is a plan view illustrating part of the sensor layer, the array substrate, and a substrate in a force sensor of a second modification when viewed from the common electrode. As illustrated in FIG. 17, a sensor layer 30C of the second modification is a solid film, which is a difference from the second embodiment. Accordingly, the sensor layer 30C covers the array layer 20 and parts of the resin substrate 5 exposed through the punched parts 14. With the sensor layer 30C as well, crosstalk is avoided since the annular guard electrodes 61 are provided.

Third Modification

Figure 18:
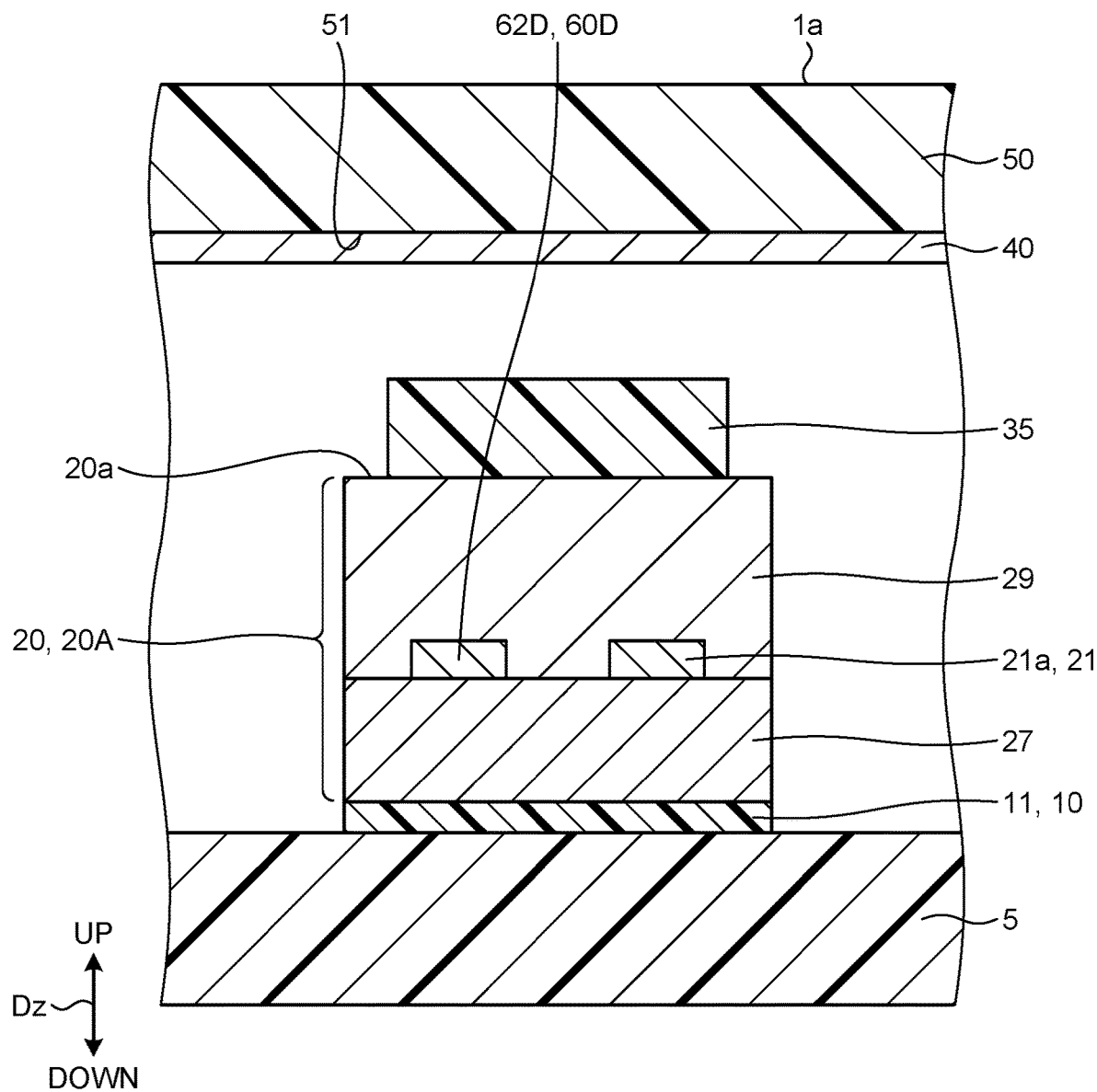
FIG. 18 is a sectional view of a first extension part in a force sensor of a third modification taken along a line in a second direction.
Figure 19:
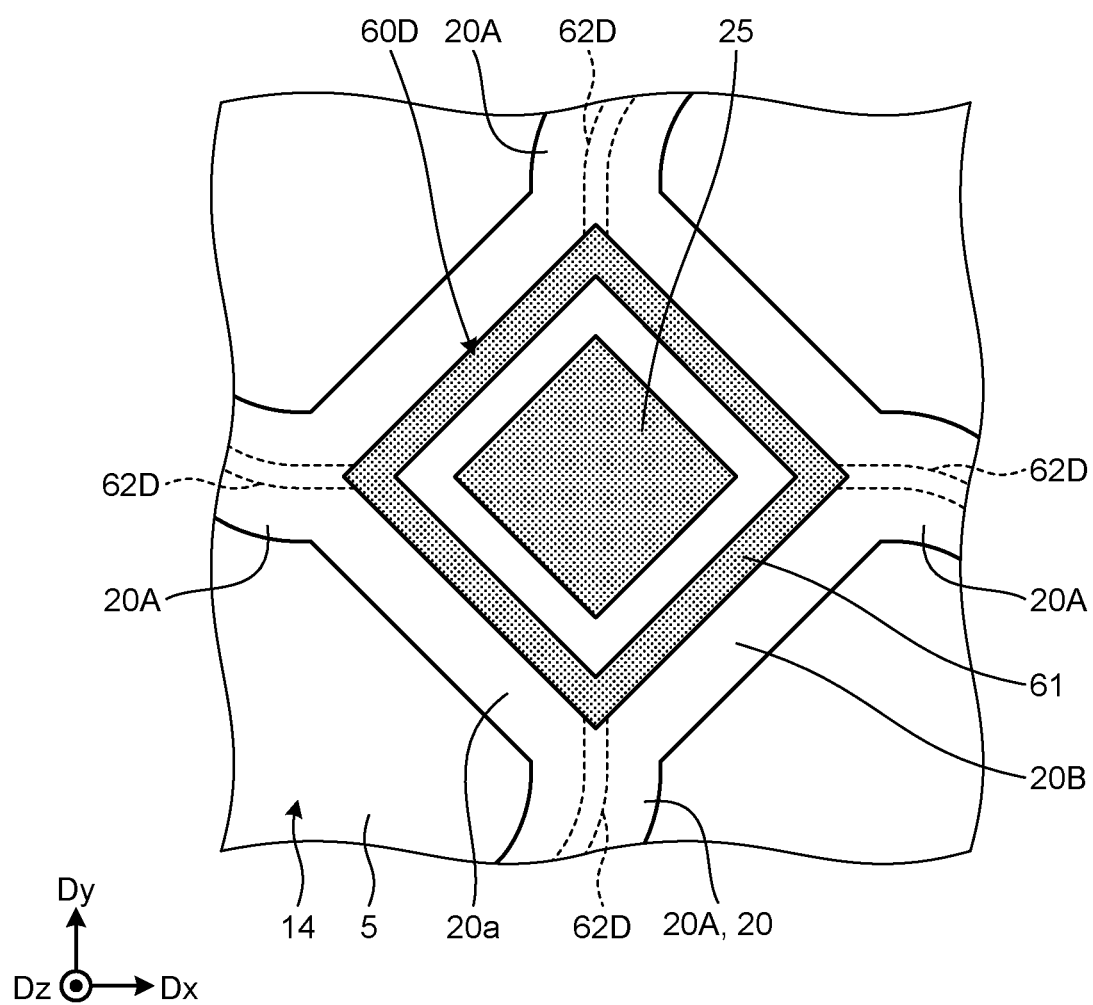
FIG. 19 is a plan view of an annular guard electrode of the force sensor of the third modification when viewed from the common electrode.

FIG. 18 is a sectional view of a first extension part in a force sensor of a third modification taken along a line in the second direction. FIG. 19 is a plan view of an annular guard electrode of the force sensor of the third modification when viewed from the common electrode. Coupling guard electrodes 62D of the third modification are disposed on the upper surface of the first insulating layer 27, which is a difference from the second embodiment. The coupling guard electrodes 62D of the third modification are formed in the same layer as the first gate lines 21a and the first signal lines 22a (not illustrated in FIG. 18). Accordingly, the coupling guard electrodes 62D can be deposited on the first insulating layer 27 simultaneously with the first gate lines 21a and the first signal lines 22a, which simplifies manufacturing.

Moreover, according to the third modification, only the annular guard electrodes 61 are disposed on the first surface 20a of the array layer 20 as illustrated in FIG. 19. Thus, in the third modification, a contact hole (not illustrated) is formed at each array-layer body part 20B. Each coupling guard electrode 62D is coupled to the corresponding annular guard electrode 61 through a contact layer (not illustrated) filling the contact hole. Accordingly, in the present disclosure, the coupling guard electrodes 62D do not need to be provided in the same layer as the annular guard electrodes 61.

Fourth Modification

Figure 20:
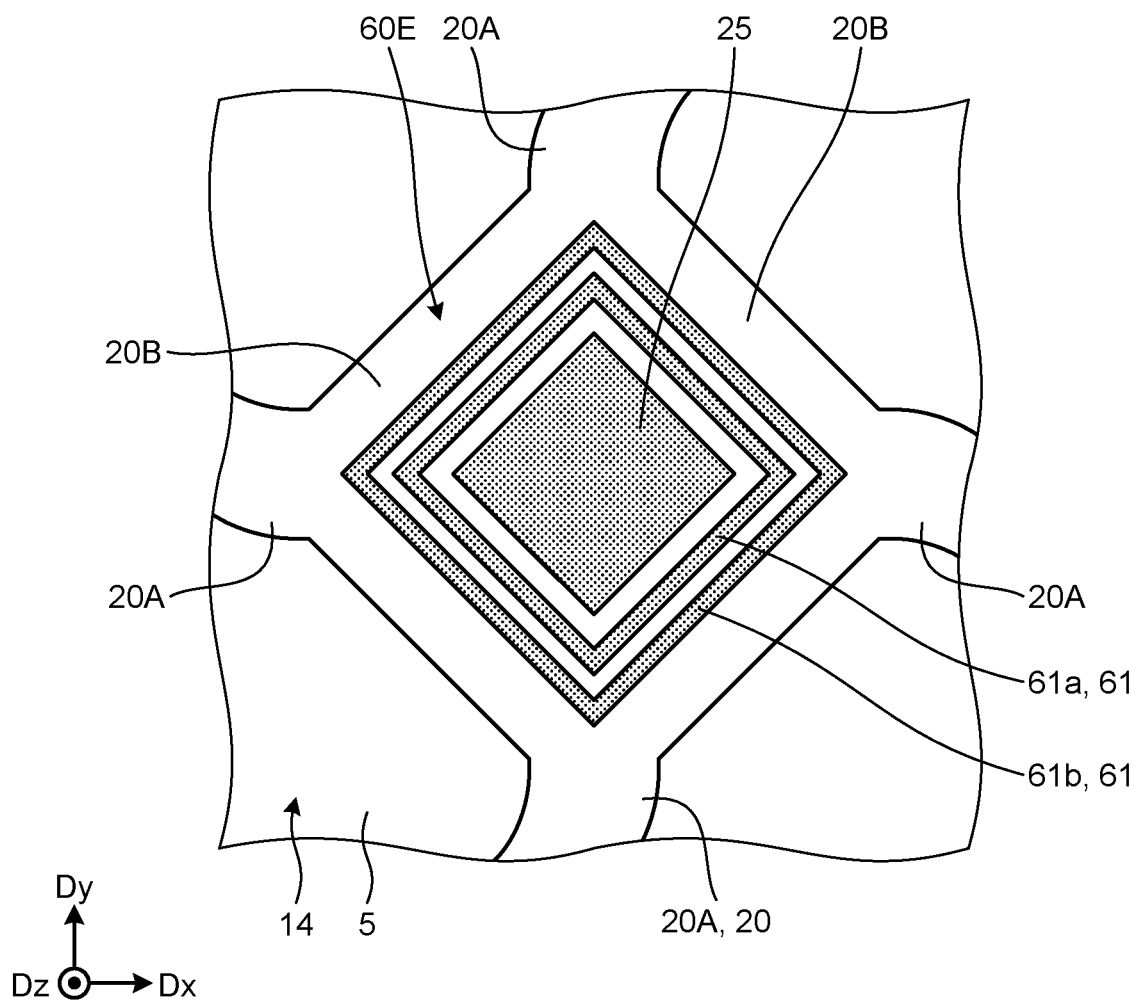
FIG. 20 is a plan view of the annular guard electrode of a force sensor of a fourth modification when viewed from the common electrode.

FIG. 20 is a plan view of an annular guard electrode of a force sensor of a fourth modification when viewed from the common electrode. Each guard electrode 60E of the fourth modification is constituted by two (a plurality of) annular guard electrodes 61 centered at the corresponding array electrode 25, which is a difference from the third modification. The two annular guard electrodes 61 are a first annular guard electrode 61a surrounding the outside of the array electrode 25, and a second annular guard electrode 61b surrounding the outer periphery side of the first annular guard electrode 61a. The first annular guard electrode 61a and the second annular guard electrode 61b are collectively referred to as a multiplex guard electrode in some cases.

The first annular guard electrode 61a and the second annular guard electrode 61b have smaller widths than that of each annular guard electrode 61 of the first modification. Although not particularly illustrated, each array-layer body part 20B is provided with a contact layer that couples the first annular guard electrode 61a to the coupling guard electrodes 62D (not illustrated in FIG. 20; refer to FIG. 18), and a contact layer (not illustrated) that couples the second annular guard electrode 61b to the coupling guard electrodes 62D. Accordingly, the first annular guard electrode 61a and the second annular guard electrode 61b are coupled in parallel to the coupling guard electrodes 62D. According to the fourth modification, when one of the two annular guard electrodes 61 is broken, the other functions as the annular guard electrodes 61. Thus, crosstalk can be reliably avoided. Although the fourth modification is described with the example in which two annular guard electrodes are provided, three annular guard electrodes or more may be provided in the present disclosure.

Fifth Modification

Figure 21:
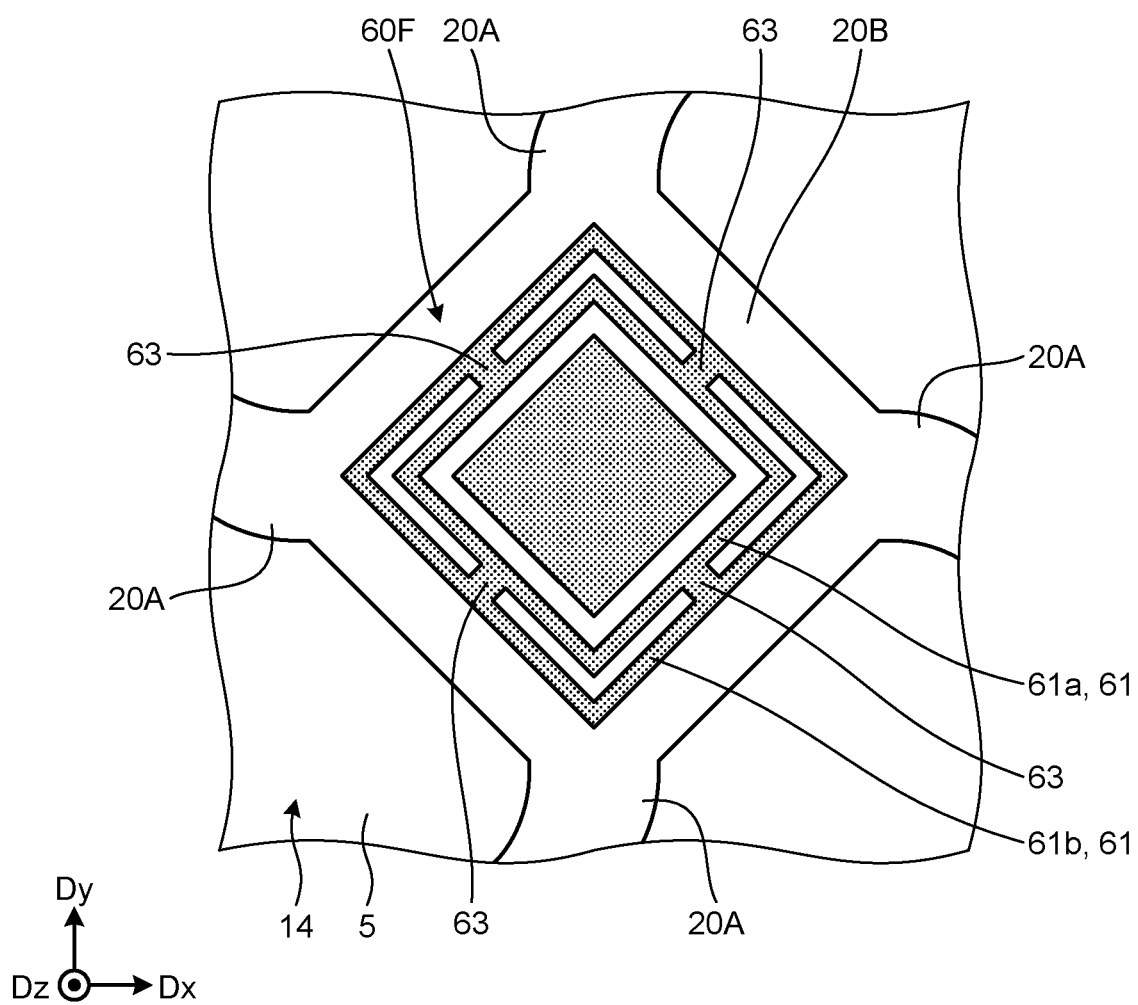
FIG. 21 is a plan view of the annular guard electrode of a force sensor of a fifth modification when viewed from the common electrode.

FIG. 21 is a plan view of an annular guard electrode of a force sensor of a fifth modification when viewed from the common electrode. Each guard electrode 60F of the fifth modification includes a coupling guard electrode 63 that couples the first annular guard electrode 61a and the second annular guard electrode 61b, which is a difference from the fourth modification. In the fifth modification, the coupling guard electrodes 62D (not illustrated in FIG. 21; refer to FIG. 18) are coupled to the coupling guard electrode 63 through a non-illustrated contact layer. Accordingly, predetermined voltage is supplied to the first annular guard electrode 61a and the second annular guard electrode 61b through the coupling guard electrode 63. According to the fifth modification, a contact layer does not need to be provided for each annular guard electrode 61, which simplifies manufacturing.

Sixth Modification

Figure 22:
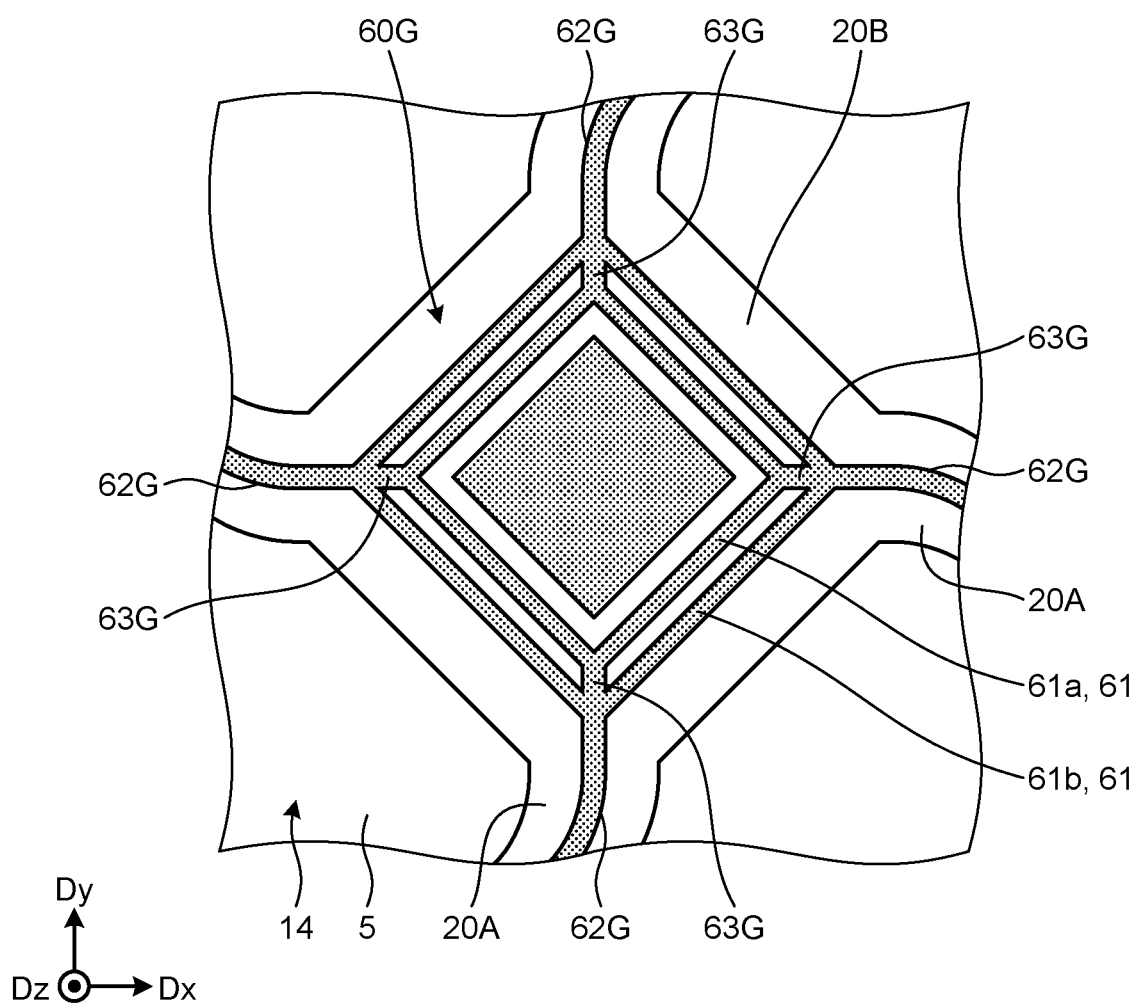
FIG. 22 is a plan view of the annular guard electrode of a force sensor of a sixth modification when viewed from the common electrode.

FIG. 22 is a plan view of an annular guard electrode of a force sensor of a sixth modification when viewed from the common electrode. In each guard electrode 60G of the sixth modification, coupling guard electrodes 62G are provided on the first surface 20a of the array layer 20, which is a difference from the fifth modification. An end part of each coupling guard electrode 62G is coupled to the corresponding second annular guard electrodes 61b. Each coupling guard electrode 63G couples corners of the corresponding first annular guard electrode 61a and the corresponding second annular guard electrode 61b. According to the sixth modification, the guard electrodes 60G are disposed in the same layer and thus can be simultaneously deposited.

FIG. 23 is a sectional view schematically illustrating a section of a force sensor of a seventh modification. Although the embodiments and the modifications are described above, the entire structure of each force sensor of the present disclosure is not limited to examples described in the first embodiment (refer to FIG. 2). In the present disclosure, the resin substrate 5 to which the array substrate 6 is bonded is attached to a separately formed housing 82 as illustrated in FIG. 23. The housing 82 may be joined to the protective film 50 by a frame-shaped spacer 81. Such a force sensor 1H can be formed through a process different from that for the housing 82. Moreover, in the present disclosure, the resin substrate 5 including the array substrate 6, the housing 82, and the protective film 50 may be joined (bonded) to an object other than the housing 82.

What is claimed is:

1. A force sensor comprising a resin substrate, an array substrate, a sensor layer, a common electrode, and a protective film that are sequentially stacked, wherein
the array substrate includes
a stretchable base material stacked on the resin substrate, and
an array layer stacked on the resin substrate with the stretchable base material interposed between the array layer and the resin substrate,
the stretchable base material includes
a plurality of first extension parts extending in a first direction parallel to the resin substrate and arranged in a second direction parallel to the resin substrate and intersecting the first direction,
a plurality of second extension parts extending in the second direction and arranged in the first direction, and
a plurality of body parts provided at parts where the first extension parts intersect the second extension parts,
the array layer includes
a plurality of array-layer branch parts stacked on the first extension parts or the second extension parts, and
a plurality of array-layer body parts stacked on the body parts,
the array-layer body parts each include
a first surface facing the common electrode, and
an array electrode stacked on the first surface,
the sensor layer includes a plurality of divisional sensor layers divided in the first direction and the second direction, and
the divisional sensor layers are provided on the first surfaces and cover the array electrodes.

2. The force sensor according to claim 1, wherein
the first extension parts extend in the first direction while alternately bending on one side and the other side in the second direction, and
the second extension parts extend in the second direction while alternately bending on one side and the other side in the first direction.

3. A force sensor comprising a resin substrate, an array substrate, a sensor layer, a common electrode, and a protective film that are sequentially stacked, wherein
the array substrate includes
a stretchable base material stacked on the resin substrate, and
an array layer stacked on the resin substrate with the stretchable base material interposed between the array layer and the resin substrate,
the stretchable base material includes
a plurality of first extension parts extending in a first direction parallel to the resin substrate and arranged in a second direction parallel to the resin substrate and intersecting the first direction,
a plurality of second extension parts extending in the second direction and arranged in the first direction, and
a plurality of body parts provided at parts where the first extension parts intersect the second extension parts,
the array layer includes
a plurality of array-layer branch parts stacked on the first extension parts or the second extension parts, and
a plurality of array-layer body parts stacked on the body parts,
the array-layer body parts each include
a first surface facing the common electrode,
an array electrode stacked on the first surface, and
an annular guard electrode stacked on the first surface, surrounding the array electrode, and equipotential with the array electrode, and
the sensor layer is provided at the array-layer branch parts and the array-layer body parts and covers the array electrodes and the annular guard electrodes.

4. The force sensor according to claim 3, wherein
the first extension parts extend in the first direction while alternately bending on one side and the other side in the second direction, and
the second extension parts extend in the second direction while alternately bending on one side and the other side in the first direction.

5. The force sensor according to claim 4, wherein
a region surrounded by the first extension parts and the second extension parts is a punched part through which part of the resin substrate is exposed, and
the sensor layer is a solid film that covers the resin substrate through the punched part.

6. The force sensor according to claim 4, wherein a plurality of the annular guard electrodes are provided around each array electrode.

7. The force sensor according to claim 3, wherein
a region surrounded by the first extension parts and the second extension parts is a punched part through which part of the resin substrate is exposed, and
the sensor layer is a solid film that covers the resin substrate through the punched part.

8. The force sensor according to claim 5, wherein a plurality of the annular guard electrodes are provided around each array electrode.

9. The force sensor according to claim 3, wherein a plurality of the annular guard electrodes are provided around each array electrode.

* * * * *